(12) United States Patent
So

(10) Patent No.: US 10,374,984 B2
(45) Date of Patent: Aug. 6, 2019

(54) METHOD AND APPARATUS FOR PROVIDING CONTENT TO A COMPUTING DEVICE

(71) Applicant: ZARBAÑA DIGITAL FUND LLC, Wilmington, DE (US)

(72) Inventor: Andrew So, New York, NY (US)

(73) Assignee: ZARBAÑA DIGITAL FUND LLC, Wilmington, DE (US)

( * ) Notice: Subject to any disclaimer, the term of this patent is extended or adjusted under 35 U.S.C. 154(b) by 877 days.

(21) Appl. No.: 13/685,918

(22) Filed: Nov. 27, 2012

(65) Prior Publication Data

US 2013/0145246 A1    Jun. 6, 2013

Related U.S. Application Data

(62) Division of application No. 11/942,597, filed on Nov. 19, 2007, now Pat. No. 8,335,994, which is a division (Continued)

(51) Int. Cl.
*G06F 17/24* (2006.01)
*H04L 12/58* (2006.01)
(Continued)

(52) U.S. Cl.
CPC ............ *H04L 51/04* (2013.01); *G06F 17/243* (2013.01); *G06Q 10/10* (2013.01); *H04L 63/20* (2013.01)

(58) Field of Classification Search
CPC ....... H04L 51/04; H04L 63/20; G06F 17/243; G06Q 10/10
See application file for complete search history.

(56) References Cited

U.S. PATENT DOCUMENTS 5,422,993 A * 6/1995 Fleming .............. G06F 3/04812
345/163
5,428,734 A * 6/1995 Haynes ................. G06F 3/0486
715/769

(Continued)

FOREIGN PATENT DOCUMENTS

JP    10-334051    12/1998
JP    104334021    12/1998

(Continued)

OTHER PUBLICATIONS

Cox et al. ("Apache e-Commerce Solutions"; http://pingu.awe.com/mark/talks/apachecon2000.pdf; pub date: Jan. 20, 2000).*

(Continued)

*Primary Examiner* — Jung-Mu T Chuang
(74) *Attorney, Agent, or Firm* — Brundidge & Stanger, P.C.

(57) ABSTRACT

Methods and systems for providing content (e.g., such as web content) to a computing device are disclosed. An example method for providing web content includes receiving, from a first computing device, a request for the web content and determining a device type of the first computing device. The example method further includes retrieving the web content and modifying the web content based on the device type. The example method still further includes providing the modified web content to the first computing device for display on the first computing device.

14 Claims, 24 Drawing Sheets

Related U.S. Application Data of application No. 09/791,369, filed on Feb. 23, 2001, now abandoned.

(60) Provisional application No. 60/185,148, filed on Feb. 25, 2000, provisional application No. 60/208,646, filed on Jun. 1, 2000.

(51) Int. Cl.
*G06Q 10/10* (2012.01)
*H04L 29/06* (2006.01)

(56) References Cited

U.S. PATENT DOCUMENTS

| | | | | |
|---|---|---|---|---|
| 5,479,364 A * | 12/1995 | Jones | | G06F 17/147 |
| | | | | 708/402 |
| 5,535,229 A * | 7/1996 | Hain, Jr. | | H04B 7/18523 |
| | | | | 332/120 |
| 5,694,163 A | 12/1997 | Harrison | | |
| 5,722,041 A | 2/1998 | Freadman | | |
| 5,760,773 A * | 6/1998 | Berman | | G06F 1/1626 |
| | | | | 345/672 |
| 5,764,816 A | 6/1998 | Kohno et al. | | |
| 5,793,365 A | 8/1998 | Tang et al. | | |
| 5,828,839 A | 10/1998 | Moncreiff | | |
| 5,838,906 A | 11/1998 | Doyle et al. | | |
| 5,848,415 A | 12/1998 | Guck | | |
| 5,862,223 A | 1/1999 | Walker et al. | | |
| 5,867,653 A | 2/1999 | Aras et al. | | |
| 5,880,731 A | 3/1999 | Liles et al. | | |
| 5,890,139 A | 3/1999 | Suzuki et al. | | |
| 5,892,764 A | 4/1999 | Riemann et al. | | |
| 5,894,305 A | 4/1999 | Needham | | |
| 5,905,476 A | 5/1999 | McLaughlin et al. | | |
| 5,926,179 A * | 7/1999 | Matsuda | | G06T 17/00 |
| | | | | 345/419 |
| 5,949,326 A | 9/1999 | Wicks et al. | | |
| 5,956,491 A * | 9/1999 | Marks | | G06Q 10/10 |
| | | | | 709/250 |
| 5,971,849 A | 10/1999 | Falciglia | | |
| 5,990,887 A | 11/1999 | Redpath et al. | | |
| 5,991,796 A * | 11/1999 | Anupam | | G06F 17/30873 |
| | | | | 707/E17.111 |
| 6,002,402 A * | 12/1999 | Schacher | | G06F 3/0481 |
| | | | | 715/810 |
| 6,012,144 A * | 1/2000 | Pickett | | G06Q 20/04 |
| | | | | 380/33 |
| 6,023,714 A * | 2/2000 | Hill | | G06F 17/211 |
| | | | | 715/235 |
| 6,061,716 A * | 5/2000 | Moncreiff | | G07F 7/00 |
| | | | | 348/E7.069 |
| 6,070,149 A * | 5/2000 | Tavor | | G06Q 30/02 |
| | | | | 705/26.7 |
| 6,081,830 A | 6/2000 | Schindler | | |
| 6,092,114 A * | 7/2000 | Shaffer | | G06Q 10/107 |
| | | | | 707/999.001 |
| 6,167,441 A | 12/2000 | Himmel | | |
| 6,170,011 B1 * | 1/2001 | Macleod Beck | | |
| | | | | G06F 17/30017 |
| | | | | 379/265.01 |
| 6,172,676 B1 * | 1/2001 | Wood | | G06F 3/0486 |
| | | | | 715/769 |
| 6,177,932 B1 * | 1/2001 | Galdes | | G06F 17/30873 |
| | | | | 705/1.1 |
| 6,212,548 B1 * | 4/2001 | DeSimone | | H04L 12/1813 |
| | | | | 709/204 |
| 6,215,877 B1 * | 4/2001 | Matsumoto | | H04L 9/0825 |
| | | | | 380/277 |
| 6,219,045 B1 * | 4/2001 | Leahy | | H04L 65/403 |
| | | | | 709/204 |
| 6,300,947 B1 | 10/2001 | Kanevsky | | |
| 6,307,487 B1 | 10/2001 | Luby | | |
| 6,370,563 B2 * | 4/2002 | Murakami | | G06Q 10/107 |
| | | | | 709/205 |
| 6,377,944 B1 * | 4/2002 | Busey | | G06F 17/30867 |
| 6,385,652 B1 * | 5/2002 | Brown | | G06Q 20/04 |
| | | | | 705/42 |
| 6,393,412 B1 * | 5/2002 | Deep | | G06Q 30/0283 |
| | | | | 705/400 |
| 6,434,604 B1 | 8/2002 | Harada et al. | | |
| 6,456,962 B1 * | 9/2002 | Allingham | | H04L 12/4608 |
| | | | | 370/387 |
| 6,496,851 B1 | 12/2002 | Morris et al. | | |
| 6,526,446 B1 * | 2/2003 | Yang | | H04L 29/06 |
| | | | | 709/230 |
| 6,539,421 B1 | 3/2003 | Appelman et al. | | |
| 6,556,217 B1 | 4/2003 | Makipaa et al. | | |
| 6,610,105 B1 | 8/2003 | Martin et al. | | |
| 6,665,395 B1 * | 12/2003 | Busey | | H04M 3/5191 |
| | | | | 379/265.09 |
| 6,677,968 B1 * | 1/2004 | Appelman | | G06Q 10/10 |
| | | | | 709/210 |
| 6,681,327 B1 * | 1/2004 | Jardin | | H04L 29/06 |
| | | | | 713/153 |
| 6,690,654 B2 * | 2/2004 | Elliott | | H04L 12/1485 |
| | | | | 370/260 |
| 6,707,811 B2 * | 3/2004 | Greenberg | | H04L 29/1216 |
| | | | | 370/352 |
| 6,714,793 B1 | 3/2004 | Carey et al. | | |
| 6,721,713 B1 * | 4/2004 | Guheen | | G06Q 50/01 |
| | | | | 705/1.1 |
| 6,742,116 B1 * | 5/2004 | Matsui | | H04L 9/0894 |
| | | | | 709/204 |
| 6,750,881 B1 * | 6/2004 | Appelman | | G06Q 10/10 |
| | | | | 715/733 |
| 6,758,754 B1 | 7/2004 | Lavanchy et al. | | |
| 6,785,708 B1 | 8/2004 | Busey et al. | | |
| 6,801,507 B1 | 10/2004 | Humpleman et al. | | |
| 6,882,641 B1 * | 4/2005 | Gallick | | H04M 3/5191 |
| | | | | 370/252 |
| 6,912,588 B1 * | 6/2005 | Jardin | | H04L 29/06 |
| | | | | 709/238 |
| 7,010,751 B2 * | 3/2006 | Shneiderman | | G06F 17/241 |
| | | | | 707/999.004 |
| 7,035,291 B2 * | 4/2006 | Grinfeld | | H04L 47/10 |
| | | | | 370/389 |
| 7,050,445 B1 | 5/2006 | Zellner et al. | | |
| 7,165,213 B1 * | 1/2007 | Busey | | H04L 12/1813 |
| | | | | 709/202 |
| 7,200,683 B1 | 4/2007 | Wang et al. | | |
| 7,464,268 B2 * | 12/2008 | Kent, Jr. | | G06Q 10/107 |
| | | | | 713/150 |
| 7,636,754 B2 * | 12/2009 | Zhu | | G06F 17/24 |
| | | | | 709/204 |
| 7,665,028 B2 * | 2/2010 | Cummins | | G06F 3/0486 |
| | | | | 715/769 |
| 7,984,098 B2 * | 7/2011 | Enete | | H04L 12/1822 |
| | | | | 709/204 |
| 8,181,024 B2 * | 5/2012 | Nagai | | G06F 21/72 |
| | | | | 713/170 |
| 8,751,572 B1 * | 6/2014 | Behforooz | | H04L 65/403 |
| | | | | 709/204 |
| 8,874,771 B2 * | 10/2014 | Munger | | H04L 29/12216 |
| | | | | 709/230 |
| 8,943,201 B2 * | 1/2015 | Larson | | H04L 63/10 |
| | | | | 709/225 |
| 2001/0013009 A1 * | 8/2001 | Greening | | G06Q 10/063112 |
| | | | | 705/7.14 |
| 2001/0013050 A1 | 8/2001 | Shah | | |
| 2001/0038624 A1 * | 11/2001 | Greenberg | | H04L 29/1216 |
| | | | | 370/352 |
| 2001/0051982 A1 * | 12/2001 | Graziani | | H04L 12/1818 |
| | | | | 709/204 |
| 2001/0054064 A1 * | 12/2001 | Kannan | | G06F 17/30867 |
| | | | | 709/203 |
| 2002/0023131 A1 * | 2/2002 | Wu | | H04L 12/581 |
| | | | | 709/205 |

(56) References Cited

U.S. PATENT DOCUMENTS

| | | | | |
|---|---|---|---|---|
| 2002/0054059 | A1* | 5/2002 | Schneiderman | G06F 17/241 715/700 |
| 2002/0087704 | A1 | 7/2002 | Chesnais et al. | |
| 2002/0126135 | A1* | 9/2002 | Ball | G06F 3/14 345/600 |
| 2002/0136167 | A1* | 9/2002 | Steele | H04L 12/1485 370/260 |
| 2002/0163888 | A1* | 11/2002 | Grinfeld | H04L 47/10 370/235 |
| 2003/0032438 | A1* | 2/2003 | Maurilio | B29C 45/76 455/500 |
| 2003/0033205 | A1* | 2/2003 | Nowers | G06Q 30/06 705/26.2 |
| 2003/0167403 | A1* | 9/2003 | McCurley | H04L 63/02 726/14 |
| 2003/0182375 | A1* | 9/2003 | Zhu | G06F 17/24 709/205 |
| 2003/0208543 | A1* | 11/2003 | Enete | H04L 12/1822 709/206 |
| 2004/0093387 | A1* | 5/2004 | Wick | H04L 12/581 709/207 |
| 2004/0107125 | A1* | 6/2004 | Guheen | G06Q 99/00 705/319 |
| 2004/0117845 | A1* | 6/2004 | Karaoguz | G08B 13/19658 725/134 |
| 2004/0193722 | A1* | 9/2004 | Donovan | H04L 12/581 709/230 |
| 2005/0027810 | A1* | 2/2005 | Donovan | H04L 12/581 709/206 |
| 2005/0044157 | A1* | 2/2005 | Bartholomew Donovan | H04L 12/581 709/206 |
| 2005/0055306 | A1* | 3/2005 | Miller | G06Q 40/04 705/37 |
| 2005/0114443 | A1* | 5/2005 | Donovan | H04L 12/581 709/203 |
| 2005/0192008 | A1* | 9/2005 | Desai | G06F 21/335 455/435.2 |
| 2006/0167986 | A1* | 7/2006 | Trzyna | H04L 51/04 709/203 |
| 2007/0016872 | A1* | 1/2007 | Cummins | G06F 3/0486 715/769 |
| 2007/0226612 | A1 | 9/2007 | Sun | |
| 2008/0065885 | A1* | 3/2008 | Nagai | G06F 21/72 713/168 |
| 2010/0175073 | A1* | 7/2010 | Hu | H04L 69/32 719/326 |
| 2011/0055735 | A1* | 3/2011 | Wood | G06Q 10/107 715/758 |
| 2011/0081016 | A1* | 4/2011 | Kargl | G06K 7/0008 380/28 |
| 2011/0218034 | A1* | 9/2011 | Barclay | G07F 17/32 463/25 |
| 2013/0268357 | A1* | 10/2013 | Heath | H04L 63/00 705/14.53 |
| 2013/0276123 | A1* | 10/2013 | Thadikaran | G06F 21/56 726/24 |
| 2014/0244429 | A1* | 8/2014 | Clayton | G06Q 30/0631 705/26.7 |
| 2014/0244447 | A1* | 8/2014 | Kim | G06Q 30/0643 705/27.2 |

FOREIGN PATENT DOCUMENTS

| | | |
|---|---|---|
| WO | WO 97/31319 | 8/1997 |
| WO | WO 98/11684 | 3/1998 |
| WO | WO 98/21664 | 5/1998 |
| WO | WO 98/34180 | 8/1998 |
| WO | WO 98/54884 | 12/1998 |
| WO | WO 99/00960 | 1/1999 |
| WO | WO 99/44149 | 9/1999 |
| WO | WO 97/23082 | 12/2009 |

OTHER PUBLICATIONS

IPivot Commerce Director 8000 News (see http://www.prnewswire.com/news-releases/new-ipivot-commerce-director-8000-boosts-performance-for-large-e-commerce-web-sites-by-up-to-150-times-74516032.html; pub date: May 12, 1999) (hereinafter CommerceDirector8000).*
https://www.irt.org/articles/js204; Drag and Drop with Microsoft Internet Explorer 5; Feb. 13, 2000 by Detert.*
"The Entangled Web—Chatman Demo", http://web.archive.org/web/19990125085107/http://chat.entagledweb.com/, (1999) (Retrieved from internet Jun. 6, 2005).
"Tech Shopper—Categories Compare and Buy . . . ", http://web.archive.org/web/20000302161824/http://techshopper.com/6/23/2005, (2000) (Retrieved from internet Jun. 23, 2005).
"The Web Developer's Virtual Library", http://web.archive.org/web/19990208010830/http://wdvl.internet.com/, The Original Encyclopedia of Web Technology, (1999) (Retrieved from internet Jun. 6, 2005).
"Paralogic Software Corporation", http://web.archive.org/web/19991013111203/http://parachat.com/, ParaChat Product Information, (1999) (Retrieved from internet Jun. 6, 2005).
"Welcome to Beyond.com", http://web.archive.org/web/19990430054659/http://beyond.com/, beyond.com, The Software Superstore, (Apr. 29, 1999) (Retrieved from internet Jun. 6, 2005).
"Welcome to ichat!", http://web.archive.org/web/19991013070129/http://ichat.com/index.html, Products: ichat Internet Community Suite, (1999) (Retrieved from internet Jun. 6, 2005).
"download.com—Welcom", http://web.archive.org/web/19990125091938//http://shareware.netscape.com/, Featured Stories, Featured Software, (Jan. 25, 1999) (Retrieved from internet Jun. 6, 2005).
"ZDNet Software Library—Top Rated Internet Programs and Utilities", http://web.archive.org/web/19990427203407/www.zdnet.com/swlib/internet.html, Softward Library, (1999) (Retrieved from internet Jun. 6, 2005).

* cited by examiner 800
810

```
HTTP://10.0.0.123/ ICHATSHOP/ REGISTER.HTML?NETSCAPE_LIVEWIRE_ID=9...

USER INFORMATION
(NOTE: * IS REQUIRED FIELD.)

*LAST NAME: [SMITH]
       MIDDLE INITIAL: [A]
         *FIRST NAME: [GEORGE]
              *EMAIL: [GEORGE@ABCD.COM]
            COMPANY: [HIGH TECH STYLE INC.]
              *PHONE: [(212) 430-3844]
                     (e.g. ### - ### - ####)
            *ADDRESS: [65 BROADWAY]
               *CITY: [NEW YORK]
              *STATE: [NY]
                *ZIP: [10006]
            COUNTRY: [USA]
              *LOGIN: [GEORGE]
          *PASSWORD: [******]
    *CONFIRM PASSWORD: [******]
          *CARD TYPE: [MASTER ▽]
        *CARD NUMBER: [5500000000000004]
                     (e.g. #### #### #### ####)
         *HOLDER NAME: [GEORGE]

DONE                                    INTERNET
```

ICHAT-SHOP ADMINISTRATION - MICROSOFT INTERNET EXPLORER

| EMPLOYEE *1510* | ADD ROOM *1520* | REGISTRATION *1530* | ADMINISTRATION OPTIONS *1540* |

MODIFY EMPLOYEE

ADD — *1550*   REMOVE/EDIT — *1560*

*SS NUMBER: 766744356    SALARY: 878454
*LAST NAME: CHOHAN       MIDDLE NAME: A
*FIRST NAME: NABEEL
*ADDRESS: 85
*CITY: NY                *STATE: NY
ZIP:                     *COUNTRY: USA
*PHONE: 212-764-7863
PAGER:                   FAX:
*EMAIL: ASN@YDFC.COM
*LOGIN ID: NABEEL
*PASSWORD: NABEEL        *RETYPE PASS: NABEEL

*1570* — SAVE    UNDO — *1580*

```
db = DB_GetConnection("DBPool_IChat");
if (db == null)
{
  write("<card>\n");
  write("<p>Database connection failed</p>\n");
  write("<do type=\"accept\" label=\"Back\">\n");
  write("<prev/>\n");
  write("</do>\n");
  write("</card>\n");
}
else
{
  cur_subject = DB_Cursor(db, "SubjectName, "SubjectDescription", "Subject", "", "");
  if (cur_subject == null || !cur_subject.next())
  {
    write("<card>\n");
    write("<p>Subject not found</p>\n");
    write("<do type=\"accept\" label=\"Back\">\n");
    write("<prev/>\n");
    write("</do>\n");
    write("</card>\n");
  }
  else
  {
    write("<card id=\"subject\">\n");
    write("<p>\n");
    write("<select name=\"mysubject\">\n");
    write("<option value=\""+cur_subject.SubjectName+"\"onpick=\"#question\">Product Information</option>\n");
    while (cur_subject.next())
    {
      write("<option value=\""+cur_subject.SubjectName+"\"
onpick=\"#question\">"+cur_subject.SubjectDescription+"</option>\n");
    }
    write("</select>\n");
    write("</p>\n");
    write("</card>\n");
    write("<card id=\"question\">\n");
    write("<p>\n");
    write("<do type=\"accept\">\n");
    write("<gohref=\"DBQuestion.html?myquestion=$(myquestion)&mysubject=$(mysubject)&myphone="+sPhone+"&myprovider="+sProvider+"\"/></do>\n");
    write("Question\n");
    write("<input name=\"myquestion\"/>\n");
    write("</p>\n");
    write("</card>\n");
  }
  DB_CloseCursor(cur_subject);
  DB_ReleaseConnection(db);
}
```

*FIG. 21*

METHOD AND APPARATUS FOR PROVIDING CONTENT TO A COMPUTING DEVICE

CROSS-REFERENCE TO RELATED APPLICATIONS

This application is a divisional application of U.S. patent application Ser. No. 11/942,597, filed on Nov. 19, 2007, which is a divisional application of U.S. patent application Ser. No. 09/791,369, filed on Feb. 23, 2001, the entirety of which is incorporated by reference herein. This application also claims priority from provisional U.S. Patent Application Ser. No. 60/185,148 entitled I-CHATSHOP AND I-CHATSERVE SYSTEM, METHOD AND APPARATUS filed on Feb. 25, 2000 and provisional U.S. Patent Application Ser. No. 60/208,646 entitled M-CHATSHOP SYSTEM, METHOD AND APPARATUS filed on Jun. 1, 2000, the entirety of which are incorporated by reference herein.

FIELD

A method, system and apparatus providing an electronic customer relations management (ECRM) application platform for exchanging information through chat, and more specifically a method, system and apparatus providing an ECRM platform for business-to-business and consumer-to-business transactions in any type of network environment, such as the world wide web ("Internet"), local area networks (LAN), wide area network (WAN), etc.

BACKGROUND

The e-commerce market in the United States is one of the fastest growing sectors of the Internet economy. The growth rate of this sector is so staggering that many U.S. merchants (e.g., any enterprise including insurance, finance, banks, travel, real estate, human resources, medical, and other enterprises or businesses, etc.) find themselves unable to adapt to the needs of their customers. Countless times, an uninformed on-line customer, faced with a decision on whether to purchase a product or service. is unable to retrieve further information about the product or service from a merchant's web site. The customer may be required to send an e-mail to the merchant or be directed to a phone number whereby the customer can call a sales-representative of the merchant. However, most customers prefer to retrieve further information about a particular product or service in real time while they are at the merchant's site. It is in the interest of the merchant to be able to push product or service information to a customer as quickly and easily as possible or risk losing an impatient customer to a competitor's product or service.

The largest problem that merchants face is developing a real-time comprehensive on-line customer service solution that will be sufficient for the scope of the Internet. Other major problems merchants must contend with include pushing product information to their customers, customer profiling and monitoring to develop a lasting customer relationship, difficulties in web site navigation and the security fears customers have prior to making an on-line purchase. There is a need for a real-time e-commerce customer relations management solution whereby consumers are encouraged to ask product questions, can readily retrieve product information and where merchants can develop a lasting relationship with their customers. There is also a need for an interface between customers and sales representatives that eases the security fears that many customers have prior to making a purchase, and that facilitates the consummation of a secure sales transaction on-line.

Further complicating the e-commerce market is the recent surge in on-line wireless customers beginning to take hold in the United States. Wireless usage in the U.S. and globally is experiencing a phenomenal surge in growth. More people use wireless devices on a daily basis to access their communications and data needs. The Cellular Telecommunications Industry Association (CTIA) posted a statistic that about a third of all Americans now have cell phones and there are new users signing up at the rate of every two seconds—a year-by-year growth rate of 25 percent. Strategy Analytics predicts that there will be 525 million Wireless Application Protocol (WAP) enabled mobile phones by the year 2003.

Several other developments will also fuel the on-line wireless craze among mobile phone users. These include an AT&T wireless announcement to offer free mobile Internet access to its mobile phone subscribers, similar offerings from competitors, and the emergence of 3G mobile phone data networks in the U.S. and globally.

The culmination of increased subscription, free service offerings, and better mobile data networks will bring an increasingly large number of content providers to on-line mobile phone and other wireless device users. The increased content causes a need for a better electronic customer service solution and data/communications sharing method, system and apparatus.

SUMMARY

In connection with the foregoing, the ECRM method, system and apparatus provides an intelligent on-line chat room for visitors (e.g., customers) and employees (e.g., a sales or service representative of an enterprise company) to conduct business-to-business or business-to-consumer electronic commerce.

In a first embodiment, a visitor logs onto a merchant's web site and is presented with a navigation page displaying a directory of chat category rooms. The visitor can select any chat category room corresponding to the visitor's inquiry about a particular product. Upon clicking on a particular chat category room, the chat category room is displayed comprising a first interface for visitors, a second interface for employees and a chat window for displaying communications between visitors and employees. In this manner, visitors can communicate with each other directly or with employees in a group chat session. Visitors can ask product questions, retrieve product information, obtain customer support and develop a lasting relationship with a sales or service representative. The real-time interaction between visitors and employees can also help ease the security fears that customers have in on-line sales transactions. In a preferred embodiment, each visitor identifier and employee identifier is separately color coded and their chat session messages are color coded in a corresponding manner to facilitate communications. Employees can join a chat category room session in the same manner.

The employee interface enables an employee to direct the flow of an inquiry/purchase. In this manner, tools available to the employee can enable the employee to present to a visitor advanced features suitable for electronic commerce. In a second embodiment, an employee can select a visitor for a private chat session by clicking on the visitor's identifier in the visitor interface of the chat category room. In the private chat session, an employee and a visitor can communicate with each other, but a visitor cannot communicate with another visitor outside of a group chat session. Employees can also submit the number of private chat sessions they are willing to accept in a given time period based on the speed and efficiency that they can handle private chats with visitors.

In a third embodiment, an employee can access unlimited instant stored messages to answer common information requests in a group or private chat session.

In a fourth embodiment, an employee can push audio or video media to a visitor, preferably in a private chat session, with no input necessary from a visitor. A visitor can view live video, pictures, a spin picture profile or audio without having to click a link or launch an application.

In a fifth embodiment, an employee can store and retrieve customer profile information during a chat session. The employee can search for visitor records to retrieve visitor preferences or to retrieve profile information to assist in helping visitors. The ECRM chat system can be used as a visitor survey and information collection tool for a business.

In a sixth embodiment, an employee can create and edit dynamic forms to collect information from a visitor and to consummate a sale transaction. The forms can be prepared by an employee and then transmitted to a visitor for verification during a chat session. Regular visitors will have their profiles stored in a form which allows employees to simply fill out an order contents field and transmit the form to visitors for order a placement. This creates a simple one step process to allow employees to place an order for visitors and consummate a sale.

In a seventh embodiment, a secure chat can be initiated within a private chat session. In a preferred embodiment, an employee can elect when to enable or disable the secure chat function. The secure chat function can be enabled when transmitting a dynamic sales transaction form to secure confidential information input by a visitor and consummate an on-line sale.

In an eighth embodiment, through a dynamic administration page, employee accounts can be created, visitor profiles can be added and removed, main category chat rooms and sub-category chat rooms can be added or removed, dynamic form fields can be changed, added, removed or edited, database information can be exported for analyses, compressed based on a set time interval to allow efficient searches to be conducted by employees (e.g., they can choose to search the most recent database, information that has been compressed and moved in a history database or search the entire database to produce results) and reports can be generated based on database information, total number of visitors using the application and any of the fields in the dynamic form can be compiled into a basic report presented through a chatting function.

In a ninth embodiment, information from an ECRM chat session can be pushed to any device including any mobile or wireless devices. The ECRM chat web server application recognizes any device type and translates web content on the fly so that it is customized for receipt by each device type. In a preferred embodiment, web content is matched to a device type using extensible markup language (XML) profiles that contain properties (e.g., size, resolution, color, depth or screen size) and eliminate properties (e.g., color) that cannot be displayed on a destination device. In this manner, a single thin client application can support a plurality of mobile or wireless devices simply by applying a unique XML profile for each destination device. Thus, any number and variety of destination devices can participate in an ECRM chat session.

It is not intended that the ECRM chat method, system and apparatus be summarized herein in its entirety. Rather, further features, aspects and advantages of the ECRM chat method, system and apparatus are set forth in or are apparent from the following brief description, detailed description, drawings and claims which follow.

BRIEF DESCRIPTION OF THE DRAWINGS

Further aspects of the ECRM chat method, system and apparatus will be more readily appreciated upon review of the detailed description set forth below when taken in conjunction with the accompanying drawings, of which:

FIG. 9 is an embodiment of a pop-up page displaying a dynamic sales transaction form in an ECRM chat session;

FIG. 16 is an embodiment of a dynamic system administration page for creating an employee account;

FIG. 21 is an embodiment of a palm query application builder;

It will be understood that the foregoing brief description and the following detailed description are exemplary and explanatory of the ECRM chat method, system and apparatus, but are not intended to be restrictive thereof or limiting of the advantages which can be achieved by the ECRM chat method, system and apparatus. Thus, the accompanying drawings, referred to herein and constituting a part hereof, illustrate embodiments of the ECRM chat method, system and apparatus and, together with the detailed description, serve to explain the principles of the ECRM chat method, system and apparatus.

DETAILED DESCRIPTION

The ECRM chat method, system and apparatus provides an intelligent chatting system for conducting business-to-business or consumer-to-business electronic commerce. Visitors (e.g., customers) and employees (e.g., sales or service representatives) communicate with each other in a group chat or a private chat environment to address visitor inquiries about a particular product or service or to consummate an on-line sale or transaction.

Figure 1:
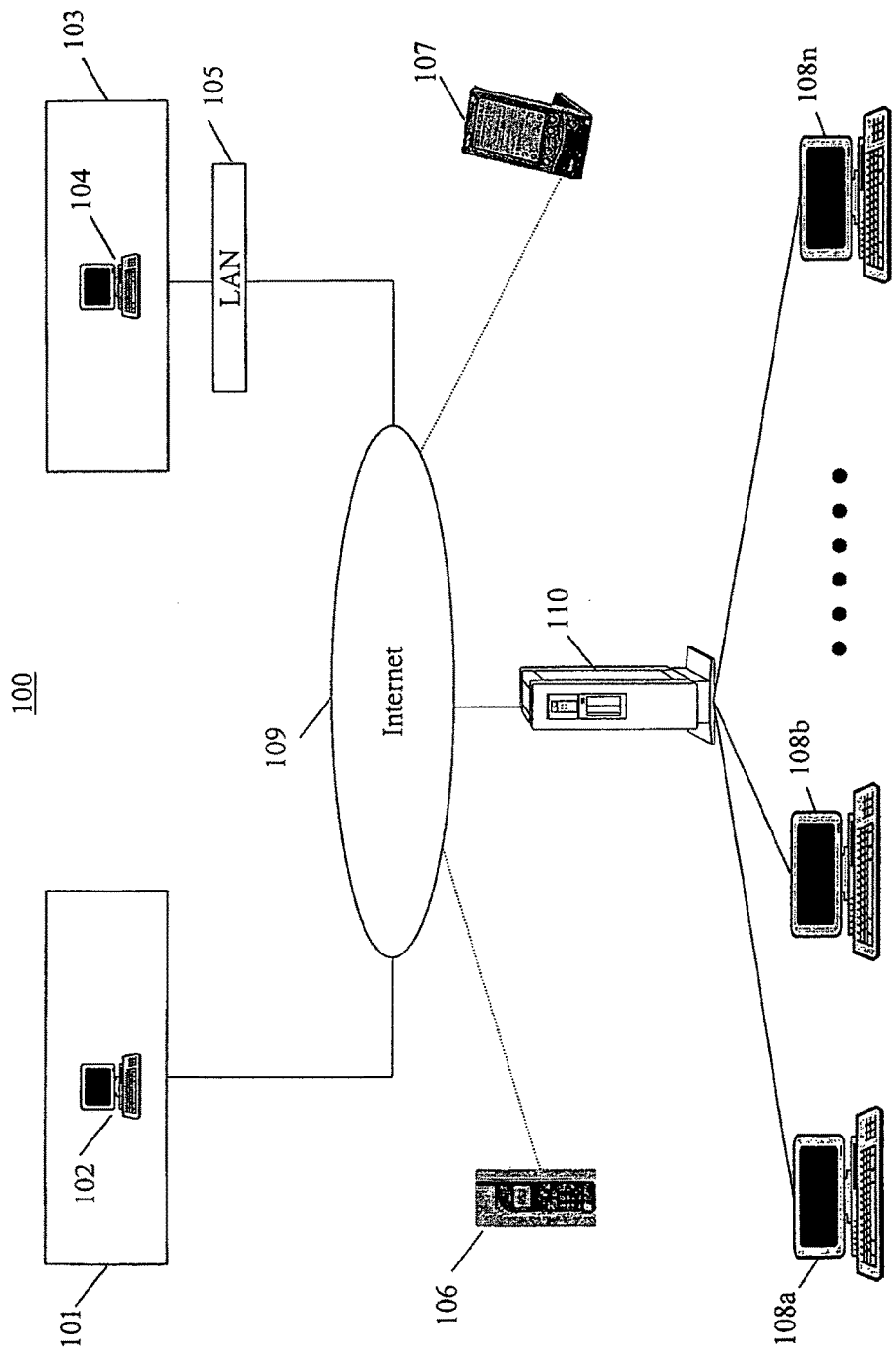
FIG. 1 is a network schematic of an embodiment of an ECRM chat system 100.

FIG. 1 is an overview of a network schematic of an embodiment of an ECRM chat system 100. An individual visitor from a residence 101 is connected to the Internet 109 through an Internet Service Provider (not shown). A corporate visitor 103 is connected to the Internet 109 via a local area network (LAN) 105. Visitors 101 and 103 can be connected to Internet 109 via any type of computing device such as personal computers 102 and 103, a work station, a network terminal, or via mobile or wireless communications using any form of wireless or hand-held remote device, such as wireless telephone 106 or palm pilot 107, that can accomplish two-way electronic communication over the network.

Visitors 101 and 103 surf Internet 109 using browsers such as Internet Explorer or Netscape Navigator. While surfing the Internet, the visitors may log onto the home page of a merchant seeking information about a product or service offered by the merchant. An ECRM chat server 110 hosts the home page of the merchant and is configured to host intelligent chatting sessions between the visitors and employees (e.g., sales or service representatives) of the merchant using personal computers 108a to 108n or any type of computer device.

Figure 2:
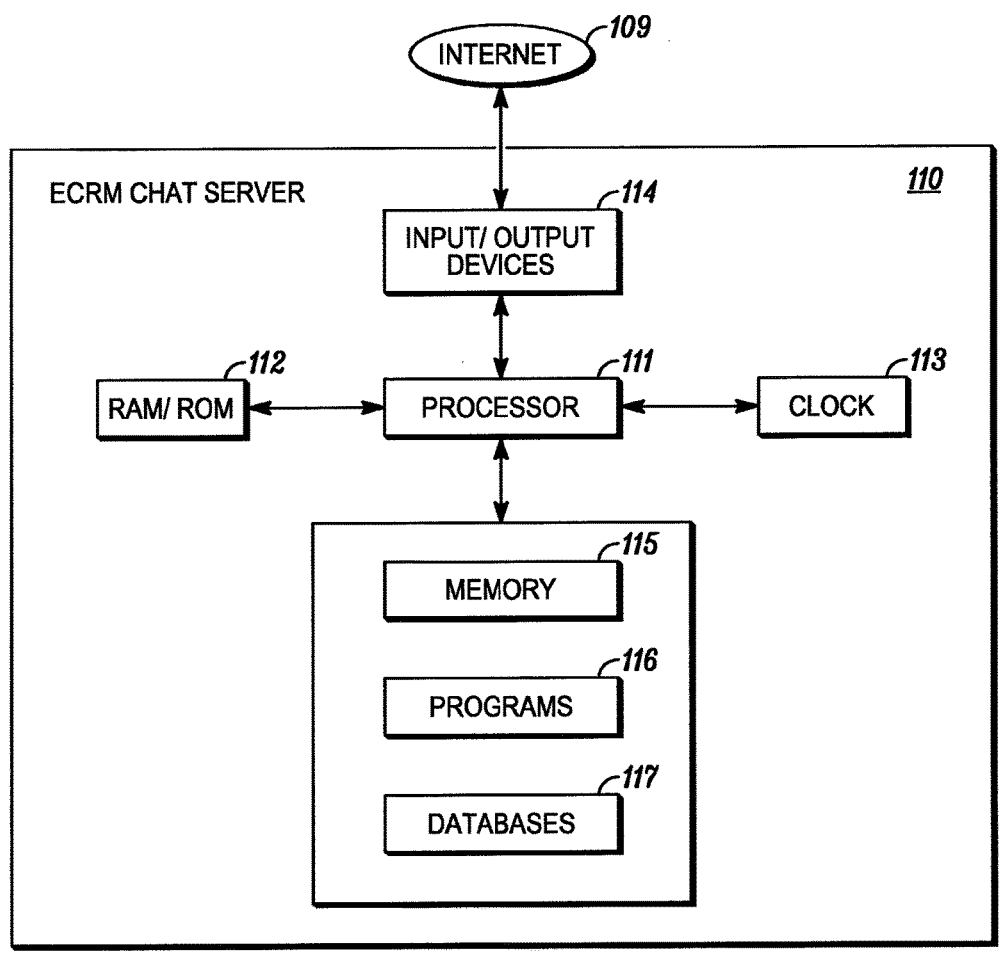
FIG. 2 is a block diagram of an embodiment of an ECRM chat server 110.

Turning now to FIG. 2, illustrated therein are exemplary components of a computer device, such as ECRM chat server 110. Any of remote visitor devices 102, 104, 106 and 107 or employee devices 108a to 108n may share a similar configuration. The primary component of ECRM chat server 110 is processor 111, which may be any commonly available microprocessor. Processor 111 may be operatively connected to further exemplary components, such as RAM/ROM 112, clock 113, input/output devices 114 and memory 115 which, in turn, stores one or more computer programs 116 and databases 117. Processor 111 is configured to host and control the ECRM chat sessions between visitors and employees.

Processor 111 operates in conjunction with random-access memory and read-only memory. The random-access memory (RAM) portion of RAM/ROM 112 may be a suitable number of Single In-Line Memory Module (SIMM) chips having a storage capacity (typically measured in kilobytes or megabytes) sufficient to store and transfer, inter alia, processing instructions utilized by processor 111 which may be received by application programs 116. The read-only memory (ROM) portion of RAM/ROM 112 may be any permanent non-rewritable memory medium capable of storing and transferring, inter alia, processing instructions performed by processor 111 during a start-up routine of ECRM chat server 110.

Clock 113 may be an on-board component of processor 111 which dictates a clock speed (typically measured in MHz) at which processor 111 performs and synchronizes, inter alia, communication between the internal components of ECRM chat server 110.

Input/output devices 114 may be one or more known devices used for receiving operator inputs, network data, and the like and transmitting outputs resulting therefrom. Accordingly, exemplary input devices may include a keyboard, a mouse, a voice recognition unit and the like for receiving operator inputs. Output devices may include any known devices used to present data to an operator of ECRM chat server 110 or to transmit data over Internet 109 to a remote visitor. Accordingly, suitable output devices may include a display, a printer and a voice synthesizer connected to a speaker.

Other input/output devices may include a telephone or network connection device, such as a telephone modem, a cable modem, a T-1 connection, a digital subscriber line or a network card, for communicating data to and from other computer devices over Internet 109, such as remote visitor devices 102, 104, 106 or 107 or remote employee devices 108a to 108n. Input/output devices can have capacity to handle high bandwidth traffic in order to accommodate communications with a large number of visitors.

Memory 115 may be an internal or external large capacity device for storing computer processing instructions, computer-readable data, and the like. The storage capacity of memory 115 is typically measured in megabytes or gigabytes. Accordingly, memory 115 may be one or more of the following: a floppy disk in conjunction with a floppy disk drive, a hard disk drive, a CD-ROM disk and reader/writer, a DVD disk and reader/writer, a ZIP disk and a ZIP drive, and/or any other computer readable medium that may be encoded with processing instructions in a read-only or read-write format. Further functions of and available devices for memory 115 will be apparent.

Memory 115 may store, inter alia, a plurality of programs 116. Programs 116 may include programming instructions for hosting an ECRM chat session and for transferring web content to any remote devices including mobile or wireless devices. Memory 115 also includes databases 117 comprising multiple blocks of information such as visitor profiles, employee accounts, chat category or sub-category rooms, audio or visual files pertaining to various products or services, quick message menus or a variety of dynamic forms.

I. Interface for Visitors

Figure 3:
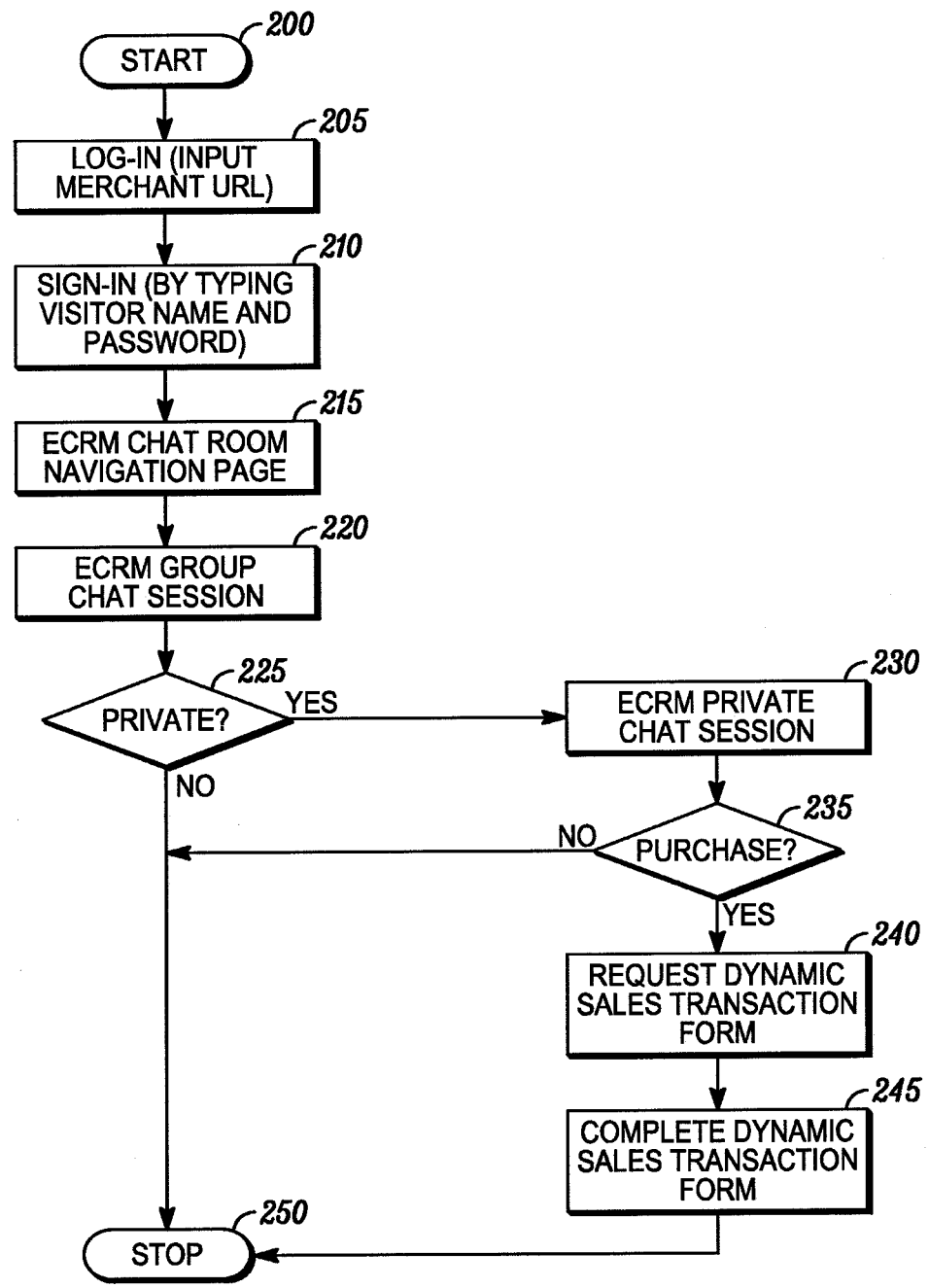
FIG. 3 is a flow chart illustrating an embodiment of a method by which a visitor participates in an ECRM group chat session.

Turning now to FIG. 3, the ECRM chat process may begin (Step 200) when in Step 205 a visitor logs onto a web site of a merchant employing an ECRM chat server. The uniform resource locator (URL) for the merchant web site may be entered into the URL entry field of the browser residing on the visitor's remote device. An exemplary sign-in window (Step 210) may then be presented on the display screen of the visitor's device including a sign-in field requiring, for example, a visitor's name or other unique identifier such as a password. Upon entering the field information, the visitor may transmit such information to ECRM chat server 110 with a clicking device, such as a mouse.

A. The ECRM Chat Room Navigation Page

In accordance with an embodiment, upon completing the log-in and sign-in steps, the visitor is presented with an ECRM chat room navigation page (Step 215) displaying a directory of main category chat rooms and/or sub-rooms. The directory allows visitors to connect to chat rooms based on main and sub-category links, coded, e.g., in hyper-text markup language (HTML), which are created dynamically through, a system administration panel. The main and sub-category chat rooms can be coordinated to correspond to a merchant's product or service line and therefore creates an easy to use navigation system which visitors will understand how to use. Employees are able to navigate through the ECRM chat system in the same manner and, as explained in more detail below, the system administration panel enables employees to add and remove main and sub-category chat rooms to allow a very easy, fast and low cost procedure to maintain and implement chat rooms coordinated with a merchant's product or service line.

Figure 4:
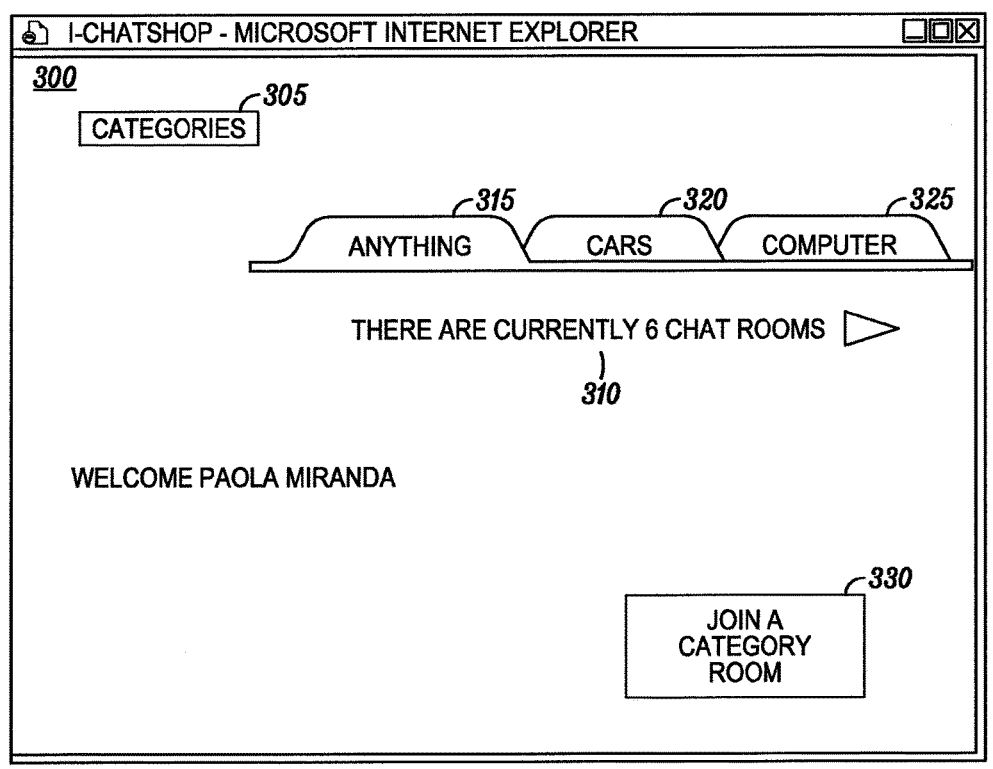
FIG. 4 is an embodiment of a navigation page in an ECRM chat system.

FIG. 4 is an embodiment of a navigation page 300 in an ECRM chat system. As shown in FIG. 4, the directory of chat room categories 305 comprises 6 main category chat rooms 310, including "Anything" 315, "Cars" 320 and "Computer" 325. In this embodiment, a visitor is invited to Join a category chat room 330. As indicated above, any number of main category chat rooms or sub-category chat rooms can be employed in an ECRM chat system, and they can be arranged in any manner. By clicking on any one of the main category chat rooms shown, the visitor will be linked to a corresponding ECRM group chat room.

B. Procedure for Initiating an ECRM Group Chat Session

Figure 5:
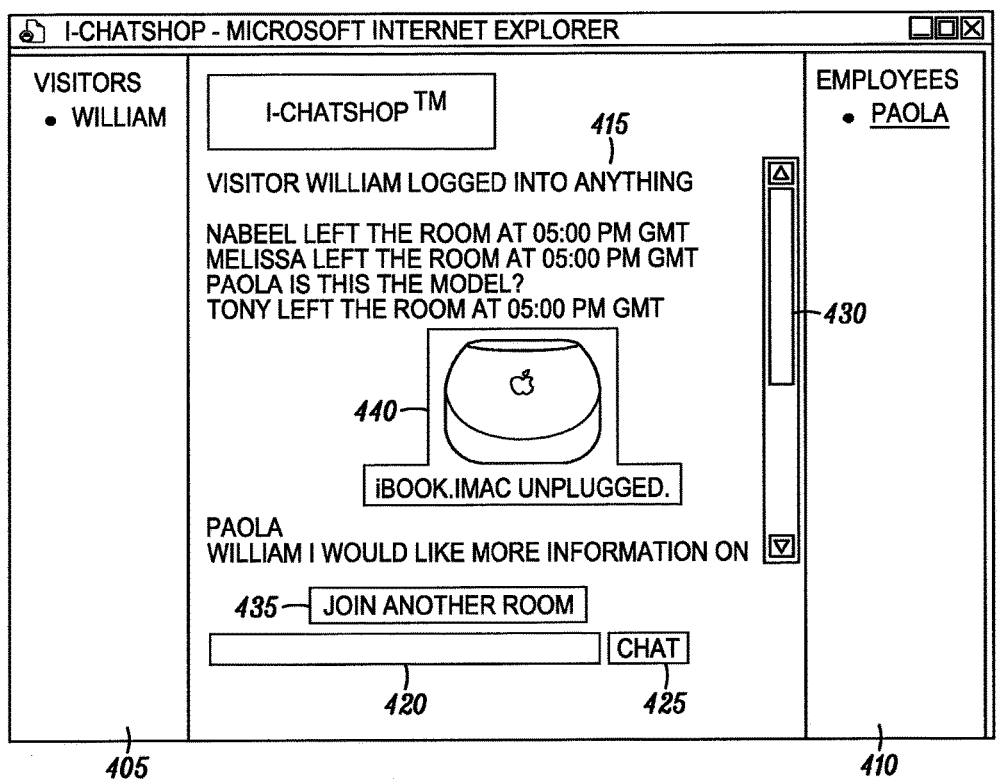
FIG. 5 is an embodiment of an ECRM group chat room displayed to a visitor comprising a visitor interface, an employee interface and a chat window.

Upon selecting a main category or subcategory chat room in Step 215 of FIG. 3, a visitor is guided to an ECRM group chat session. As shown in FIG. 5, a visitor "William" clicked on main category "Anything" 315 and is consequently directed to an ECRM group chat room for the category "Anything" in Step 220.

FIG. 5 is an embodiment of an ECRM group chat room 400 displayed to visitor "William" comprising visitor interface 405, employee interface 410 and chat window 415. In this embodiment, visitor interface 405 appears on the left margin of the ECRM group chat room. Under the heading "Visitors", a single visitor "William" is listed. However, any number of visitors can join in this group chat room in which case each visitor identified (e.g., name) will appear in the left margin together with visitor "William".

In this embodiment, employee interface 410 appears on the right margin of the ECRM group chat room.

Under the heading "Employees", a single employee "Paola" is listed. However, any number of employees can join in this group chat room in which case their identifier (e.g., a name) will appear in the right margin together with employee "Paola".

In the center margin of this ECRM group chat room embodiment appears chat window 415 where visitors can communicate with each other or with employees. As shown on FIG. 5, ECRM group chat room 400 contains field 420 to type chatting statements and button 425 labeled "chat" to transmit typed statements which are then viewed in chat window 415. ECRM group chat room 400 also may contain scroll bar 430 for viewing chat window 415 and buttons to link to other options. In this case, a visitor may click on a "Join another room" button 435.

As shown in FIG. 5, color-coded separation can also be employed to distinguish parties engaged in a chat session. Here, employee "Paola" has a different color-code from visitor "William" and their chat messages displayed in chat window 415 have corresponding color-codes. Any number or variety of color-codes or other identifiers can be employed to distinguish visitors and/or employees from each other.

During the group chatting session, in addition to text chatting, visitors may be presented with streaming media, including audio, video or pictures, transmitted by an employee. Based on an inquiry from a visitor or voluntarily, an employee may push audio/video streaming data for display in chat window 415 to the visitors. For example, an employee may be interested in demonstrating the performance or other qualities of a new product or service or teaching how to operate a product. Preferably the employee has full control over pushing the media data to visitors so that the visitors do not need to open or launch any extra software, such as "Real Play" or "Media Player", to view or listen to the media data. As shown in FIG. 5, a video image "iBook.IMAC unplugged" image 440 is displayed in chat window 415.

Allowing visitors to engage in a group chat with multiple employees encourages a collaborative team environment. When a visitor has a question about a product or service that a business offers, if one employee assisting the visitor is unable to answer the question then others may be able to help. Such a situation is not uncommon in the case of a complex product or service. Similarly, a visitor in a group chat may obtain sufficient information about a product or service simply by monitoring other visitors' communications with employees. This increases the productivity function of e-commerce customer service management and reduces the frequency of being unable to answer visitor questions. This also improves the user experience that visitors have; they can share thoughts and comments with each other while receiving streamlined help and assistance from employees.

Visitors in an ECRM group chat session may visit another chat session involving a different main category or sub-category or switch into an ECRM private chat session at any time simply by selecting an appropriate option (e.g., by clicking on a button) on the chat room display. Or, a visitor may click on an employee name listed in employee interface 410 to initiate a private chat session with a selected employee based on their availability. For example, as shown in FIG. 5, employee "Paola's" name is underlined, signifying a hyperlink to a private chat room.

In Step 225 of FIG. 3, a visitor decides to enter a private chat session. In this embodiment, the visitor is guided to ECRM private chat session 230 to purchase (Step 235) a product or service as described below.

In Step 250, a visitor can quit a group or private chat session at any time.

C. Procedure for Initiating an ECRM Private Chat Session

In an ECRM private chat session, only one visitor participates with one or more employees. The private chat window has substantially the same features as the group chat window such as displaying the exchange of text messages and streaming media. However, the private season is preferably equipped for improved security for confidential communications. A secure socket layer (SSL) may be initiated that encrypts sensitive information exchanged in a private chat session. Preferably an employee can elect when to enable or disable the secure chat function. This process streamlines the lag on the server and creates an efficient secure chat environment. The secure chat is also designed to work with hardware e-commerce accelerators which are designed to speed up the process of SSL transactions and traffic and reduce the server load; since messages in secure chat are treated as an SSL transaction, the e-commerce hardware accelerators speed up the process of transmitting and receiving the messages. Utilizing this feature of a private chat session, a dynamic sales transaction, involving confidential information (e.g., a visitor's credit card number), can be consummated to purchase a product or service on-line.

At Step 225 of FIG. 3, a visitor is invited to join or decides to join a private chat session with at least one employee. The visitor can be invited to join a private chat session when an employee clicks on the visitor's name in a visitor interface of a group chat session; alternatively, a visitor can click on an employee's name in an employee interface of a group chat session to initiate a private chat session (as shown in FIG. 5, employee "Paola's" name is underlined in employee interface 410 indicative of a hyperlink to a private chat room). In either case, the visitor is guided to a private chat session (Step 230). A visitor can switch back and forth to group or private chat sessions freely during any time of a session since the two types of chat sessions are operated independently. An employee, upon deciding that another employee has specific expertise to answer a ISP visitor inquiry, may invite the other employee for a private chat session. The visitor may be transferred by the employee to another employee for a one to one private chat session. The transfer may be performed by the employee, for example, by simply clicking on the visitor's name and dragging it to the other employee's name on the chat window (i.e., drag and drop method).

In Step 230, a visitor interacts with one or more employees in a private chat room. The visitor communicates with an employee by typing text messages in a text field. In addition to a text chatting function, the private chat room is configured to receive streaming media files. Prompted by a visitor inquiry or voluntarily, an employee may push audio/video streaming data for display in the private chat room to a visitor to demonstrate, for example, the performance or other characteristics of a product or service. Preferably, the employee controls the display of audio/video streaming data so that a visitor does not need to open or launch any extra software such as "Real Play" or "Media Player" to view or listen to such media data.

In Step 235, a visitor may decide to purchase a product or service. The visitor requests a dynamic sales transaction form from an employee in Step 240. The form usually includes fields for information to be filled in by the visitor to process the sales transaction. In response to the request, the employee pushes a dynamic sales transaction form to the visitor. The form may be displayed in a pop-up screen on the visitor's computing device. In Step 245, the visitor inputs the appropriate information to complete the form and transmits the completed form back to the employee. In a preferred embodiment, the visitor must complete all fields of the dynamic sales transaction form for a successful transaction.

For the steps of inputting information into the form and transmitting the form to the employee, the employee initiates and enables the secure chat function to ensure a secure transmission of information. Alternatively, the visitor may request the enabling and disabling of the secure chat function.

Upon receiving the completed form, the employee places an order for the product or service to an appropriate sales department for further processing. The submitted information may be saved under an account for the visitor and used for subsequent transactions. In such circumstances, future sales transactions can be consummated with minimal or no input by the visitor.

In Step 250, the chat session is completed.

II. Interface for Employees

Employees may participate in a chat session with a similar sign-in and/or registration procedure as visitors. While chatting with visitors in a private or a group chat session, an employee uses a separate interface from visitors. In addition to the basic functions for a chatting environment, the interface for an employee is designed to incorporate a variety of tools that can be utilized by an employee during a chat session. The tools enable an employee to provide enhanced e-commerce customer relationship management services to visitors by expediting communications, pushing streaming media features, conducting customer database searches and administration of the chat sessions. These tools add efficiencies to the chat sessions and increase the quality of the services provided by employees.

A. Procedure for Initiating an ECRM Group Chat Session

Figure 6A:
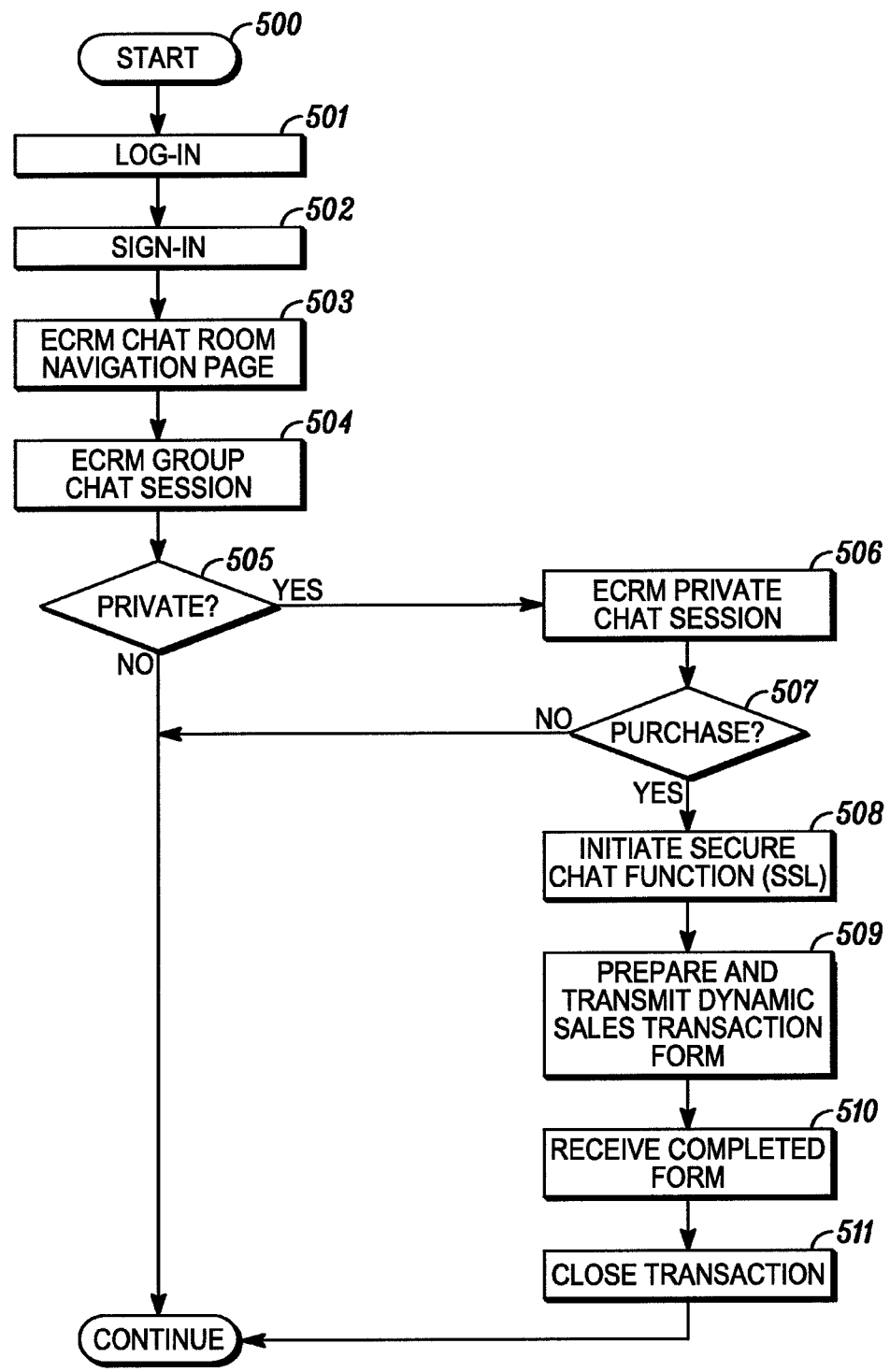
FIGS. 6A and 6B are flow charts illustrating an embodiment of a method by which an employee participates in an ECRM group or private chat session, including the use of employee tools and administration options.
Figure 6B:
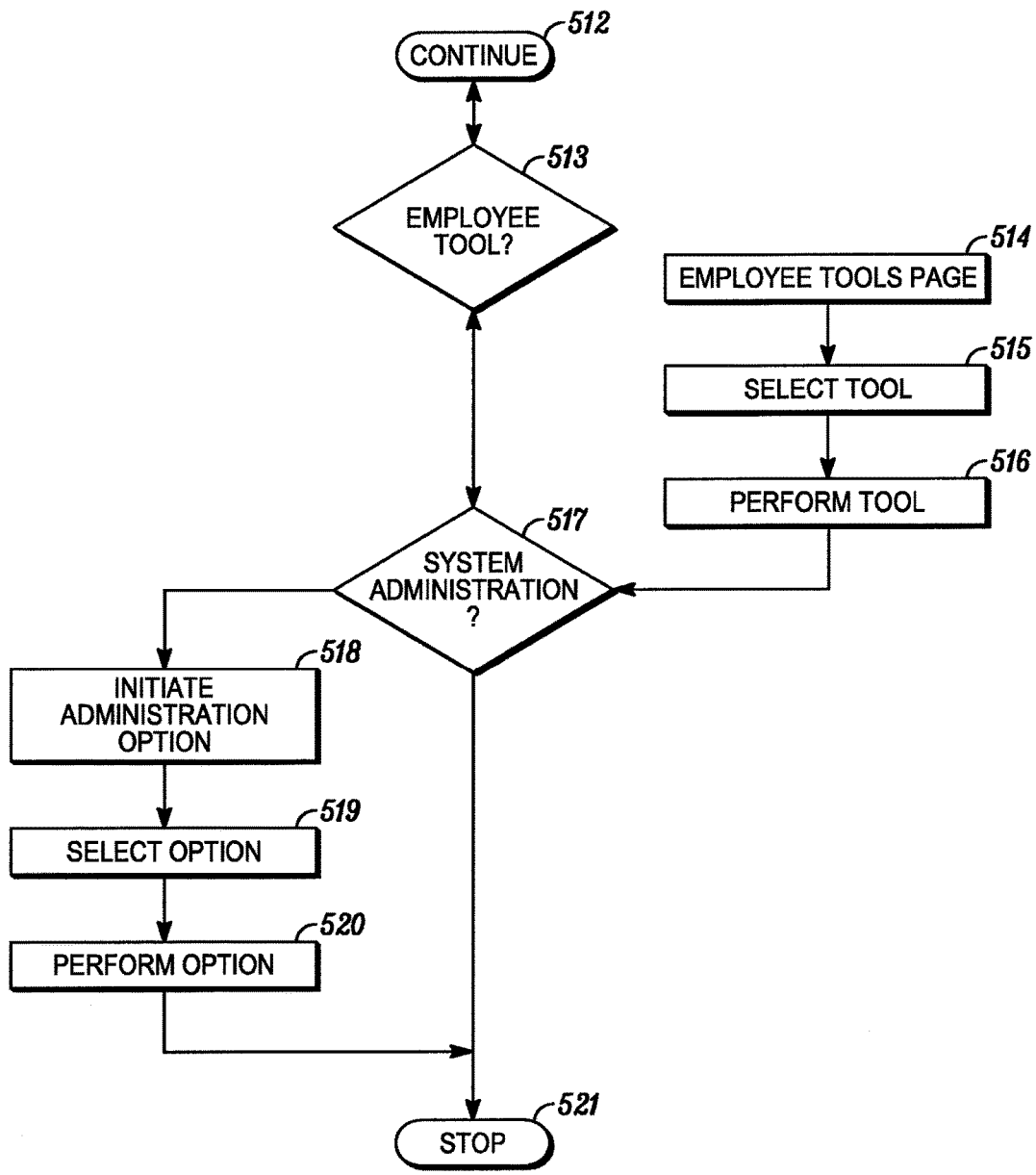

FIGS. 6A and 6B are flow charts illustrating an embodiment of the process by which an employee participates in a group or private chat session. The process starts (Step 500) through log-in (Step 501) and sign-up (Step 502) procedures similar to those undertaken by visitors. Employees (e.g., sales or service representatives of a merchant company) may be located either in-house or remote from a merchant company. Each employee, however, is connected to the ECRM chat server of the company and has access to the databases of the server.

In Step 503, an employee is presented with an ECRM chat room navigation page and selects the category or sub-category chat room that the employee elects to participate. Each employee is preferably assigned to specific category and sub-category room(s) based on their knowledge and experience with respect to particular products and/or services offered by the merchant company.

Figure 7:
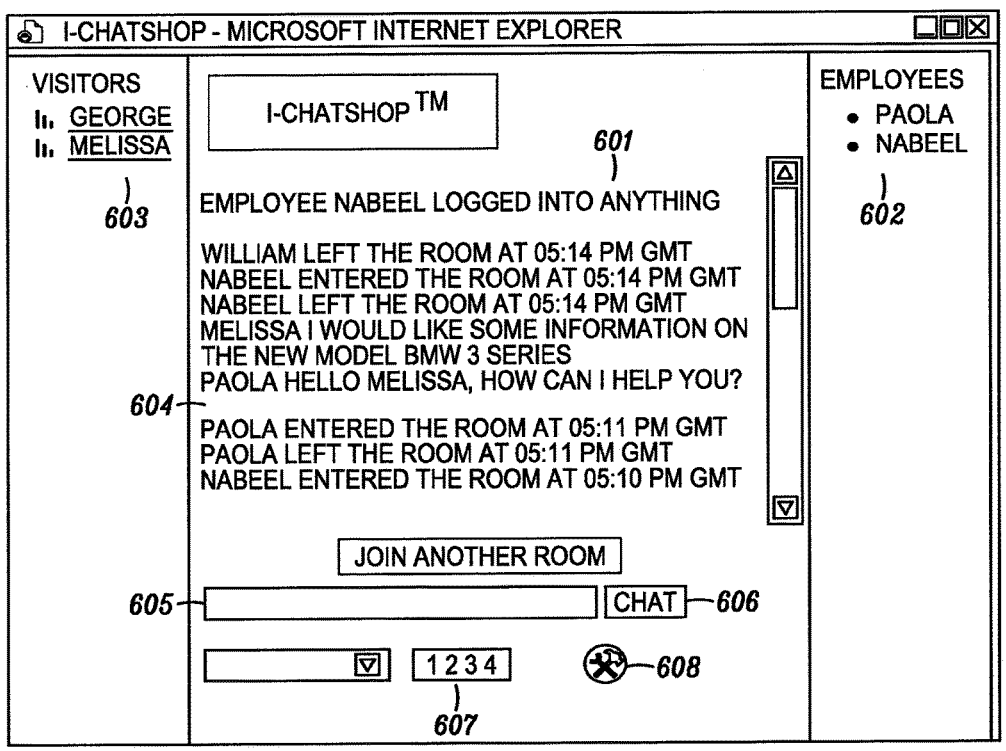
FIG. 7 is an embodiment of an ECRM group chat room displayed to an employee comprising a visitor interface, an employee interface and a chat window.

In Step 504, upon deciding to participate in an ECRM group chat session, the employee is presented with a group chat room comprising an employee interface, visitor interface and chat room window. An embodiment depicting group chat room 600 is illustrated in FIG. 7. Here, employee "Nabeel" chose to log into main chat category room "Anything" 610. Employee interface 620 includes employees "Paola" and "Nabeel". Visitor interface 630 includes visitors "George" and "Melissa". Chat room window 640 displays the chat messages of "Nabeel", "Melissa" and "Paola". Employee "Nabeel" can continue to participate in the chat discussion by inputting text messages in field 650 and transmitting the messages via chat button 660. Again, visitors and employees participating in a chat session are separately color-coded and their respective chat messages are separately color-coded in a corresponding manner to facilitate communications during a chat session.

B. Procedure for Consummating a Sale in an ECRM Private Chat Session

In Step 505, employee "Nabeel" can initiate a private chat session with any visitor by clicking on the visitor's name. By separating the employees from the visitors in two distinct interfaces, the employees can clearly select visitors to whom they wish to speak privately. If a situation entails a more complicated question or involves sensitive information during a sales transaction, an employee can initiate a private chat session with a particular visitor by clicking on the visitor's name. As shown in FIG. 7, visitor names "George" and "Melissa" are underlined indicating a hyperlink to a private chat session.

Figure 8:
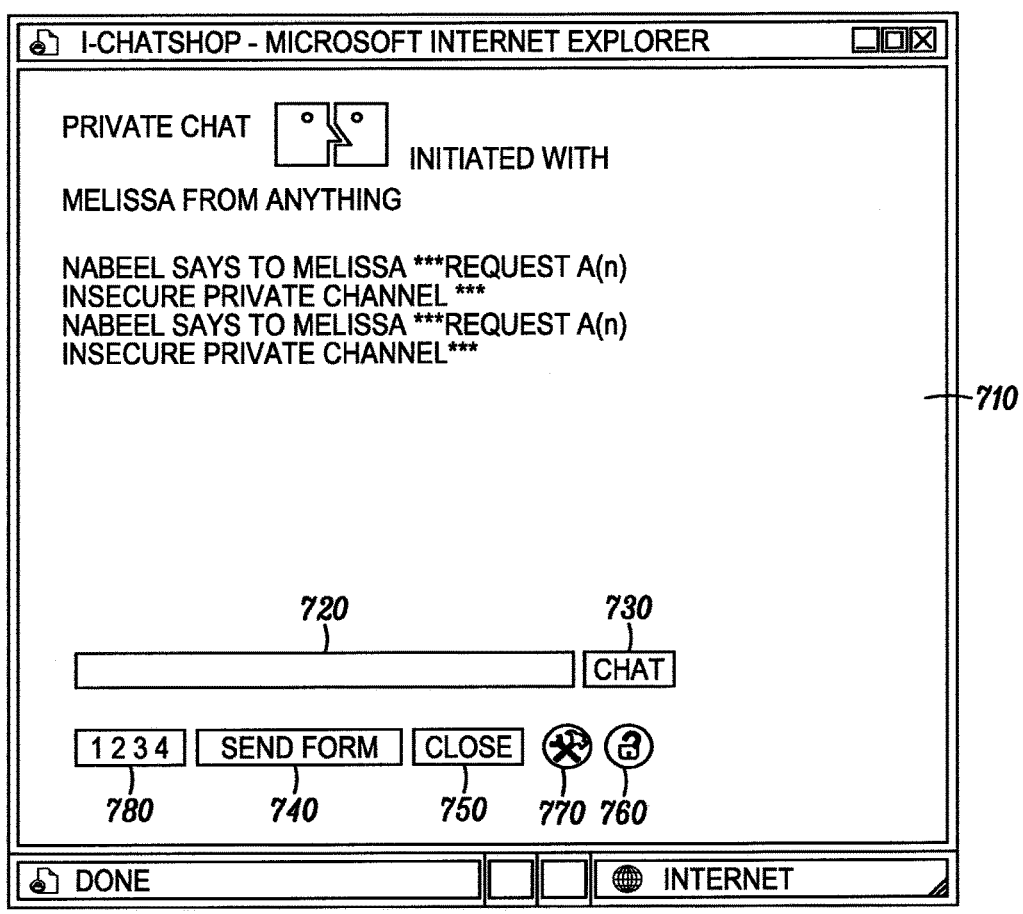
FIG. 8 is an embodiment of an ECRM private chat room.

In Step 506, upon initiating a private chat session, an employee is presented with an ECRM private chat room for communicating solely with the visitor selected. FIG. 8 is an embodiment of private chat room 700 displayed to employee "Nabeel" for communications with visitor "Melissa". The basic function and design of private chat room window 710 is similar to the chat room window employed in group chatting session, including text field 720 and chat button 730. However, in this embodiment, private chat room window 710 also includes employee tools for supporting a purchasing request from a visitor. For example, private chat room window 710 may include a "Send Form" button 740 for transmitting a dynamic sales transaction form to a visitor and a "Close" button 750 to close a transaction upon receiving a completed transaction form from a visitor. Furthermore, private chat room window 710 may include a button 760 to enable and disable a secure transmission session, such as a secure socket layer (SSL), to increase the level of security of a transmission of confidential information from a visitor.

In Step 507, employee "Nabeel" receives a purchase request from visitor "Melissa" in private chat room 700. In Step 508, employee "Nabeel" initiates a secure chat function to enable secure transmission of confidential information by clicking on button 760. ECRM chat server 110 is configured to encrypt all transmitted data exchanged between employee "Nabeel" and visitor "Melissa" when the secure chat function is enabled. A secure chat session can be initiated at any time by an employee or a visitor during a private chat session or during a group chat session in other embodiments.

In Step 509, employee "Nabeel" prepares and transmits a dynamic sales transaction form to visitor "Melissa", The form can be displayed to visitor "Melissa" as a pop-up screen on Melissa's computing device, so that Melissa can complete the form by filing in the required information in the blank text fields. Alternatively, employee "Nabeel" ma, help visitor "Melissa" to fill out the form by accessing a database where the visitor's private information is stored. For example, while "Melissa" is filling out the form, "Nabeel" may access the database to find out the credit card number of "Melissa" which is required to complete the sales transaction. "Nabeel" then fills out the credit card number for "Melissa" at the employee's window assuming that the employee's window is also provided with a similar sales transaction form. The collaboration between the visitor and employee in simultaneously filling out the form expedites one transaction.

In Step 510, employee "Nabeel" receives a completed transaction form from visitor "Melissa". The transmission from the visitor is secured by the security measure taken in Step 508. An embodiment of a completed dynamic sales transaction form 800 is illustrated in FIG. 9. Completion of the form is facilitated by scroll bar 810.

In Step 511, upon receiving the completed transaction form, employee "Nabeel" closes the transaction by clicking on "Close" button 760 shown in FIG. 8. Upon clicking on "Close" button 760, the secure chat function preferably is disabled. Employee "Nabeel" may click a button to store the received transaction information to RAM/ROM 112 of ECRM chat server 110. The stored information can be accessed by, for example, a sales department for further processing and shipping.

C. Employee Tools

The separate interface for employees during a chat session enables employees to access and utilize employee tools which provide them with the ability to create a multimedia rich and dynamic chat environment for visitors, with preferably nothing more than text input by visitors during chat sessions. Several featured employee tools are:

TABLE-US-00001 Quick Messages: Unlimited instant stored messages, retrievable by employees, to answer redundant information requests. Streaming Employees can send images, audio and Audio and even video to visitors with no input Video Push Technology: necessary from them. Visitors can watch live video, see pictures, or hear audio without having to click a link or launch an application. Database Search: Employees can search for visitor records, to retrieve visitor preferences or to retrieve profile information to assist in helping visitors. The ECRM chat sessions can be used as a visitor survey and information collection tool for visitors. Employees can retrieve important information that creates an intelligent chat environment suitable for assisting visitors with questions about specific products or about their interests. Multi-Task Options: Multi-task mode allows employees to perform multiple tasks while monitoring ECRM chat session traffic. As a visitor enters a room and asks a question a visual and/or audible alert signals employees to the incoming question. Employees can also limit the number of private chats they are able to accept based on the speed and efficiency they can handle private chats with customers.

The foregoing tools are not exhaustive of the employee tools that are suitable for use in ECRM chat sessions and enabled by the unique visitor/employee chat interface of ECRM chat rooms. Moreover, chat room displays can be configured with any number or variety of buttons, icons, tabs, folders or other link mechanisms for accessing employee tools.

Figure 10:
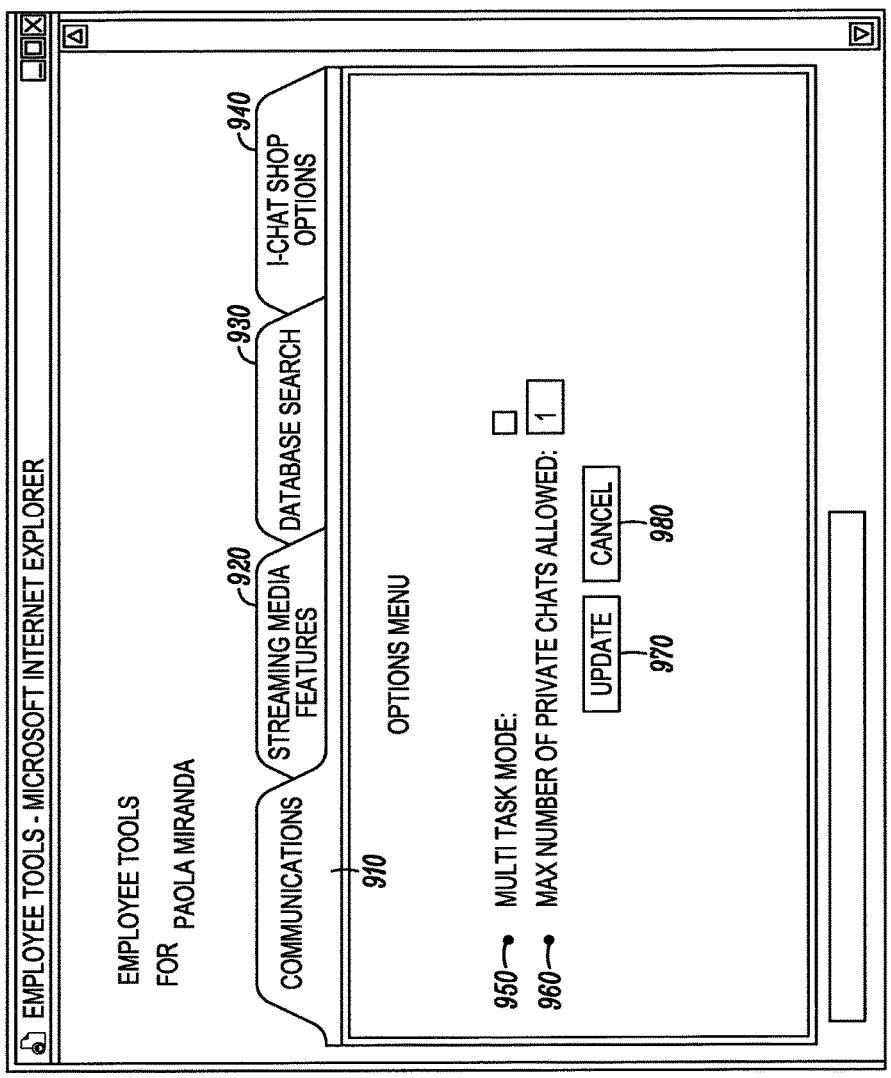
FIG. 10 is an embodiment of an employee tools page for use during an ECRM chat session.

FIG. 10 is an embodiment of an employee tools page 900 from which employees can access and manage such tools as "Communications" 910 (quick message menu), "Streaming Media Features" 920, "Database Search" 930 and "Multi-Task Options" 940. As shown in FIG. 6B, at any time during a group chat or a private chat session, an employee can choose to utilize employee tools (Step 513) by accessing the employee tools page (Step 514), selecting a tool (Step 515) and performing a tool (Step 516). Employee tools page 900 can be accessed by an employee directly from a group chat room by clicking on tool button 680 (FIG. 7) or private chat room by clicking on tools button 770 (FIG. 8).

1. Communications

Figure 11:
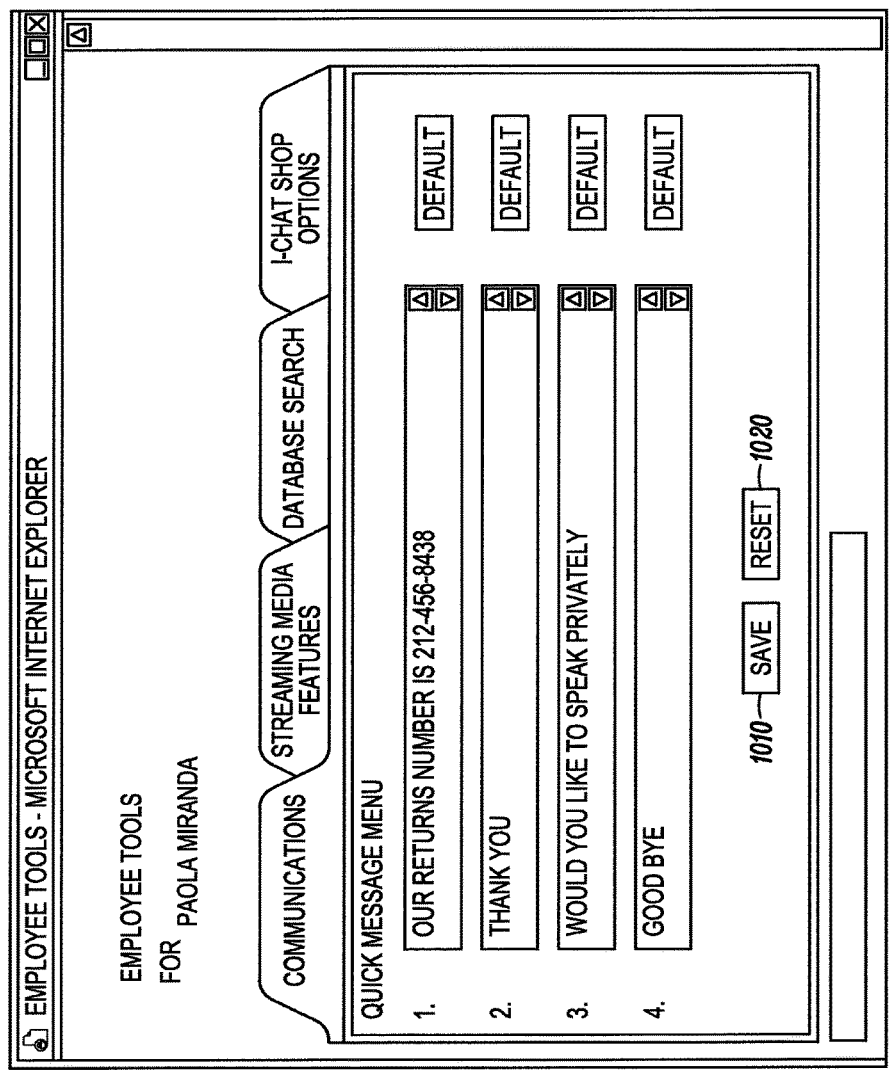
FIG. 11 is an embodiment of a communications page by which an employee accesses a quick message menu in order to respond to a visitor during an ECRM chat session.

By clicking on "Communications" tool 910 shown in FIG. 10, an employee can gain access to a "Quick Message Menu" page 1000 shown in FIG. 11. The "Quick Message Menu" can be configured to store any number of instant stored messages to quickly respond to redundant or common questions asked by visitors in a chat room. Rather than typing text to respond to such a question, employees can quickly access a response from the "Quick Message Menu".

As shown in FIG. 11, responses have been configured in the "Quick Message Menu" as follows:
1. "Our returns number is 212-456-8438".
2. "Thank you".
3. "Would you like to speak privately".
4. "Good Bye".

These responses can be saved (1010), reset (1020) or modified in any manner, and can be quickly retrieved by an employee to respond to a question in an ECRM group or private chat room.

For example, included in the display of group chat room 600 of FIG. 7 are numbers "1 2 3 4" (670) which correspond to "Quick Message Menu" 1000 items 1 through 4. An employee may choose to click on one of the numbers "1 2 3 4" (670) rather than typing in text to respond to a visitor's question. For example, to respond to a visitor's inquiry concerning the return phone number for a merchant's business, an employee could simply click on the number "1" and the response Our returns number is 212-456-8438" will be displayed in chat room window 640. Private chat room 700 is similarly configured with numbers "1 2 3 4" (780) which correspond to "Quick Message Menu" items 1 through 4.

2. Streaming Media Features

Figure 12:
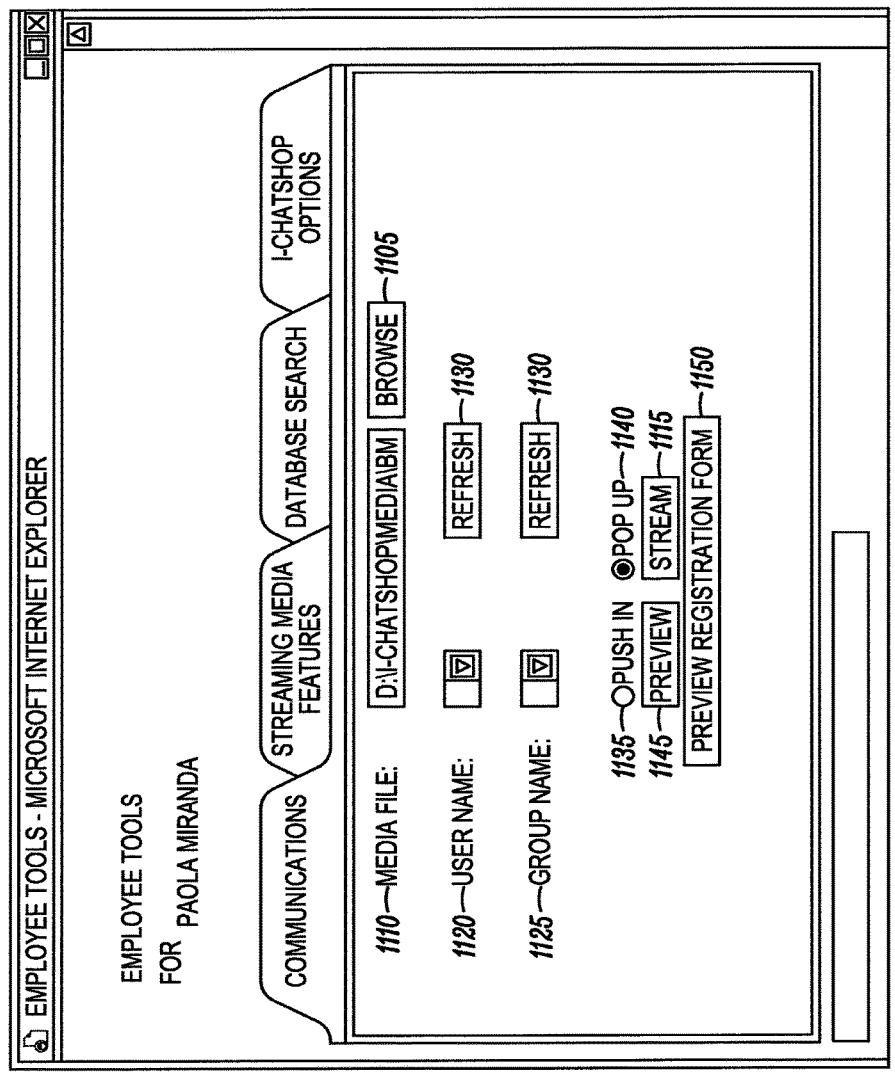
FIG. 12 is an embodiment of a streaming media page by which an employee accesses and pushes media to a visitor during an ECRM chat session.

FIG. 12 is an embodiment of a streaming media features page 1100 by which an employer pushes media files to visitors. Using the "Browse" button 1105, an employee can locate "Media File" 1110 in Databases 117 of ECRM chat server 110. Once a suitable file is located, an employee simply clicks the "Stream" button 1115 to transmit the file to an appropriate chat room window. A file can be directed to a specific visitor in a private chat room by specifying "User Name" 1120 or to a group of visitors in a group chat room by specifying "Group Name" 1125. This process can be repeated to send the file to different visitors of groups by clicking on the "Refresh" buttons 1130. The employee can either select "Push In" 1135 so that the file is displayed in a chat room window or "Pop up" 1140 so that the file is displayed in a pop-up screen adjacent a chat room window. Using the "Preview" button 1145, an employee can preview the media file before transmitting, or can preview a registration form by clicking on the "Preview Registration Form" button 1150.

Figure 13:
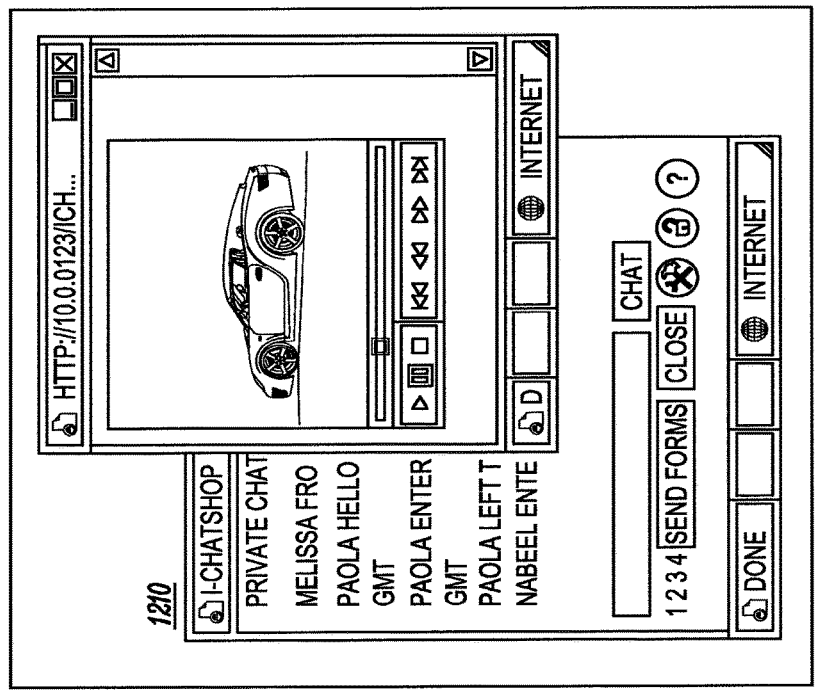
FIG. 13 is an embodiment illustrating streaming media displayed to a visitor during an ECRM chat session.

FIG. 5 illustrates a "Push In" file of "iBook.iMac unplugged" 440 displayed in a chat room window. FIG. 13 is an embodiment of pop-up screen 1200 displayed during private chat session 1210 which displays a streaming video of an automobile. In a preferred embodiment, a spin-picture profile of a product (e.g., an automobile) can be pushed out to visitors whereby the product is rotated in three-dimensions on its axis so that it can be viewed on all sides by a visitor.

In this manner, images, audio, video, web pages, e-mail addresses, pictures and more can be pushed out to visitors with no input necessary from them. Visitors can watch live video, see pictures or hear audio without having to click a link or launch an application. The entire experience is preferably controlled by an employee ensuring a multimedia rich experience for the visitor.

3. Database Search

By implementing a Database Search, an employee has the ability to retrieve valuable information about visitors, including their preferences and profile information, as they chat. The Database Search tool can also be used as a visitor survey and information collection tool for a business. If a visitor is unregistered, employees can retrieve such information as log-in name, computing device type, connection speed, browser type, operating system and installed plug-in information. If a visitor is registered, employees can retrieve such information as address, phone number, past order history and preference information; these fields are fully dynamic so multiple fields can be added or taken out. Using visitor profile information, employees can provide a targeted chat environment to provide customer service, sell or cross sell products.

Figure 14:
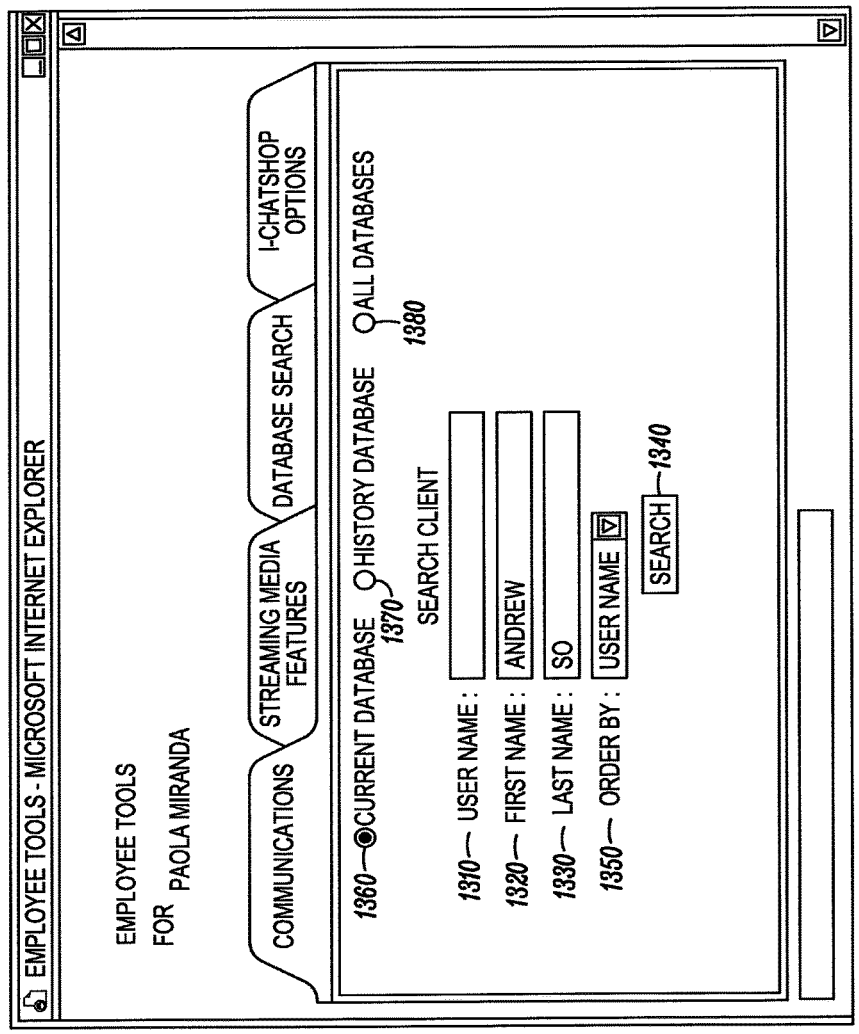
FIG. 14 is an embodiment of a database search page by which an employee can access a visitor's profile during an ECRM chat session.

FIG. 14 is an embodiment of Database Search page 1300 by which an employee can search a visitor's previous record or profile. An employee simply inputs a visitor's name in "User Name", "First Name" and/or "Last Name" text fields 1310, 1320, 1330, respectively, and clicks "Search" button 1340: Alternatively, an employee can click on a user name in "Order By" field 1350 prior to conducting a search. The employee may specify the search database. In this embodiment, three separate databases can be searched: (1) "Current Database" 1360; (2) "History Database" 1370; and (3) "All Databases" 1380. Current Database 1360 may store visitor transaction information for a current time period, e.g., one month, six months or one year. History Database 1370 may store visitor transaction information based on a visitor's historical transactions which can span several years or more. All Databases 1380 may comprise several databases, one directed to visitor sales transactions, another to visitor addresses, another to visitor complaints and so forth.

Figure 15:
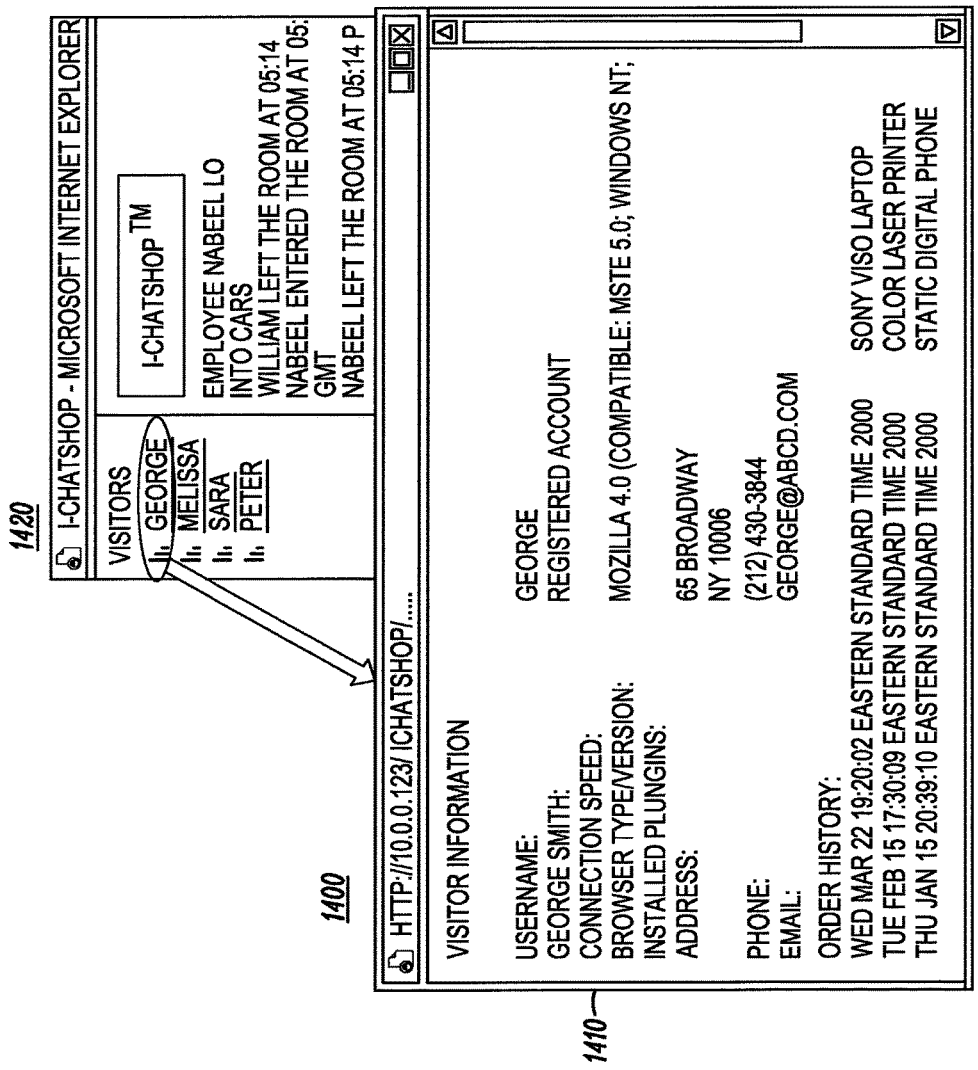
FIG. 15 is an embodiment illustrating a visitor's profile displayed to an employee during an ECRM chat session.

During a group or private chat, an employee may access Database Search page 1300 to learn about a particular visitor's historical transactions. In response to clicking Search button 1340, a pop-up screen may be displayed to an employee providing information about a particular visitor. FIG. 15 is an embodiment of pop-up screen 1400, displaying "Visitor Information" file 1410 including an "Order History" for visitor "George", viewed by an employee during group chat session 1420. Such visitor information files are useful for sales transactions. Visitors who have previously purchased products or services may have their information stored in such visitor information files so that employees can use this information to prepare dynamic sales transaction forms that they can send to visitors for order placement. This creates a simple one step process that allows an employee to place an order for a visitor. The visitor information files may even include an identification of a visitor's remote computing device type or even the connection type of a visitor's computer system such as Integrated Service Digital Network (ISDN), Digital Subscriber Line (DSL) or regular modem. Such information can be used by an employee to determine the form and type of multimedia data that can be pushed to visitors.

4. Multi-Tasks Options

Turning back to FIG. 10, Employee Tools page 900 displays "Multi Task Mode" field 950 and "Max Number of Private Chats allowed" field 960. Multi-task mode allows employees to perform multiple tasks while monitoring chat traffic. As a customer enters a room and asks questions a visual and/or audible alert signals employees to the incoming question. In this manner, employees responsible for more than one chat category or sub-category room can monitor incoming questions from visitors. Employees can also control the number of private chats they are willing to accept based on the speed and efficiency that they can handle private chats with customers, by setting maximum limits on the number of private chats they are willing to accept in any time interval or for any chat category or sub-category room. The "Multi Task Mode" field 950 and "Max Number of Private Chats allowed" field 960 can be updated 970 or cancelled 980.

D. System Administration

The ECRM chat system also includes a dynamic administration page. Through this portion of the system, employee accounts can be created, edited or deleted, visitor accounts can be created, edited or deleted and main category and sub-category chat rooms can be added, edited or removed from the navigation directory. The dynamic form fields can also be created, edited or deleted from the administration page. Other options include exporting one or more databases to have the information contained analyzed or compressing a database based on a set time interval to allow efficient searches to be conducted by employees—they can choose to search the most current database, information that has been compressed and moved into a history database or search the entire database to produce results. Reports can also be generated based on database information. Such reports can be used to monitor and manage employees participating in each chat room of the system, or to monitor visitors attending each chat room. In addition, any of the fields in a dynamic form can be compiled into a basic report presented through a charting function. The dynamic administration page facilities the management of ECRM group and private chat sessions.

FIG. 16 illustrates an embodiment of dynamic administration page 1500. Dynamic administration page 1500 includes buttons to link to specific administrative functions such as "Employee" button 1510 for modifying employee accounts, "Add Room" button 1520 for adding, removing or editing a category or sub-category room, "Registration" button 1530 for modifying a dynamic form and "Administrative Options" button 1540 for exporting and compressing databases and operating reports. The number of link buttons, icons or other link mechanisms may vary in type and number depending on the administration functions necessary.

As illustrated in FIG. 16, an employee has clicked on "Employee" button 1510 and is in the process of modifying an employee account by adding 1550, removing/editing 1560 information. The employee account can be saved 1570 to an ECRM chat server database or deleted 1580 from a database. Visitor accounts can be managed in the same manner.

Figure 17:
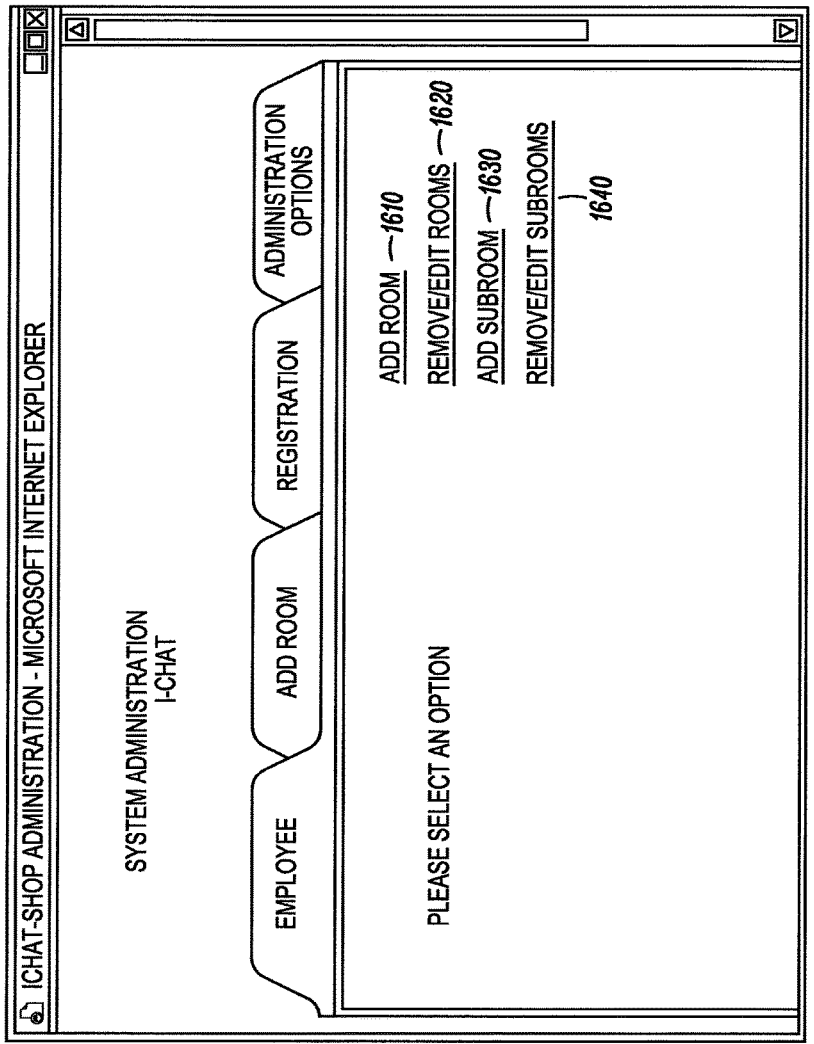
FIG. 17 is an embodiment of a dynamic system administration page for adding, removing or editing a chat category room or sub-category room.

FIG. 17 illustrates an embodiment of "Add Room" administration page 1600. As shown in this embodiment, an employee can "Add Room" 1610, "Remove/Edit Rooms" 1620, "Add SubRoom" 1630 or "Remove/Edit SubRooms" 1640 by clicking on the corresponding links for these options.

Figure 18:
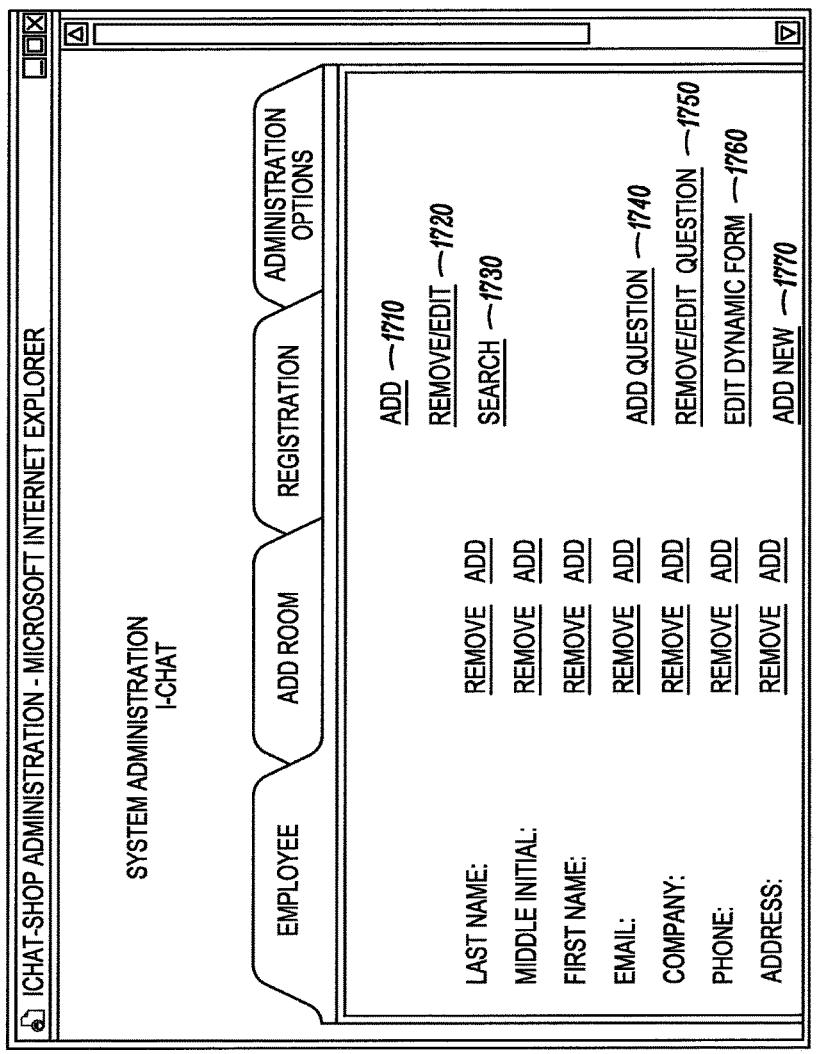
FIG. 18 is an embodiment of a dynamic system administration page for creating or editing a dynamic form.

FIG. 18 illustrates an embodiment of "Registration" administration page 1700. As shown in this embodiment, an employee has a variety of options to create, modify or delete a dynamic form, including "Add" 1710, "Remove/Edit" 1720, "Search" 1730, "Add Question" 1740, "Remove/Edit Question" 1750. "Edit Dynamic Form" 1760 and many more options are available by scrolling down the page.

Figure 19:
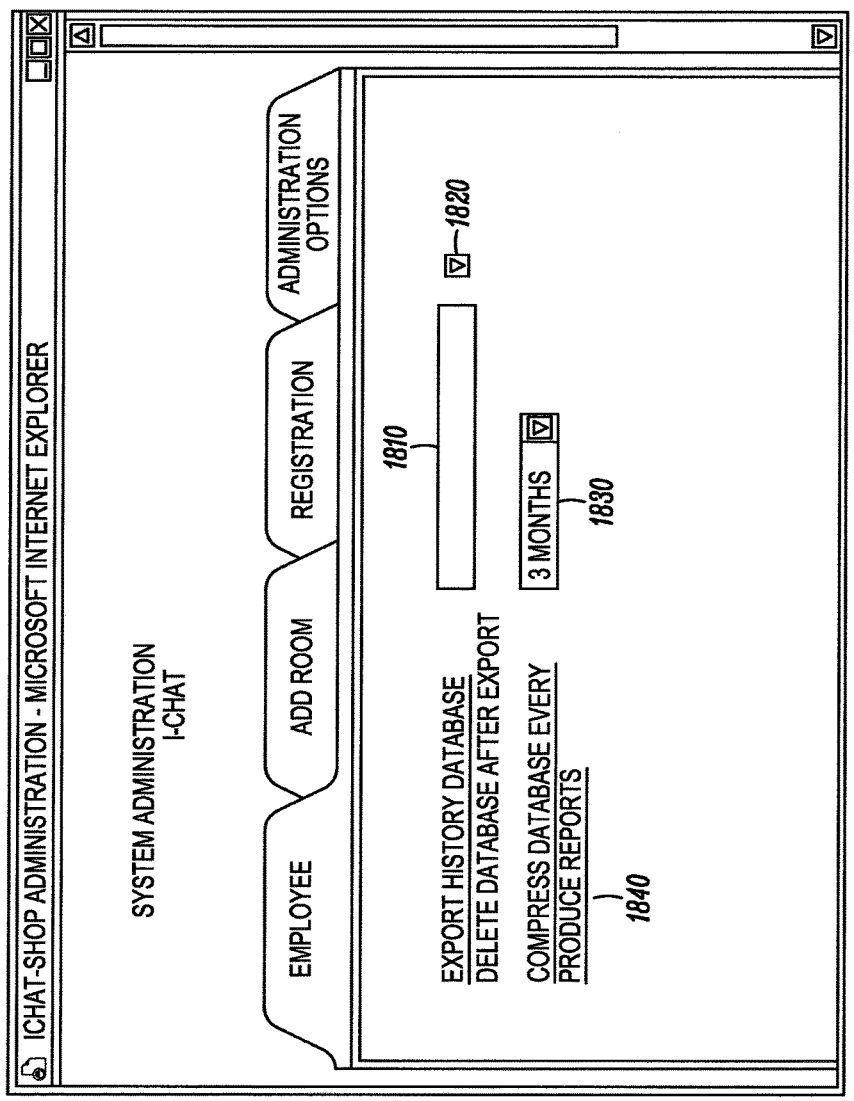
FIG. 19 is an embodiment of a dynamic system administration page for exporting a database, compressing a database or generating reports based on database information.

FIG. 19 illustrates an embodiment of "Administrative Options" administration page 1800 including "Export History Database" option field 1810. By typing in a database identifier, a specific database can be exported for analysis. Such a database can also be deleted after export by checking field 1820. Other options include compressing a database based on a set time interval input in field 1830 and "Produce Reports" 1840. In this embodiment, the "Compress Database" option has been set for 3 months.

III. Application to Wireless Communications Devices

The ECRM chat system provides the same service to visitors equipped with internet-enabled mobilized or wireless communication devices such as mobile phone device 106 and palm pilot device 107. Visitors may communicate with employees using the wireless communication devices or with each other through ECRM chat server 110. The ECRM chat system provides a messaging and customer service platform for palm-to-palm, palm-to-mobile phone, or any combination of wireless devices and web sites. The ECRM chat server can be configured to recognize any type of wireless device and format web content for display on any type of wireless device. With this configuration, employees need not be concerned with the types of communication devices utilized by visitors when employees transmit web content, including streaming media, to visitors during group and/or private chat sessions. For example, an employee can download a photograph of a product and transmit it to a visitor without concern as to the type of computer device utilized by the visitor, e.g., a personal computer, mobile phone or palm pilot. The ECRM chat server automatically formats the photograph so that it can be displayed on the visitor's device.

In this manner, the ECRM chat system is capable of sharing information between multiple independent remote wireless devices. The ECRM chat system can be configured to provide an instant message service between visitors, such that a buddy-list method of messaging may be utilized by a group of visitors. The group of visitors may be able to communicate with each other even where their computer devices vary. For example, visitor A using a mobile phone may communicate with visitor B using a palm pilot. Visitors A and B communicate through the ECRM chat server which formats the web content so that it can be displayed on the devices of both visitor A and B. Such a configuration is especially suitable for a group of sales or service representatives of a merchant.

Figure 20:
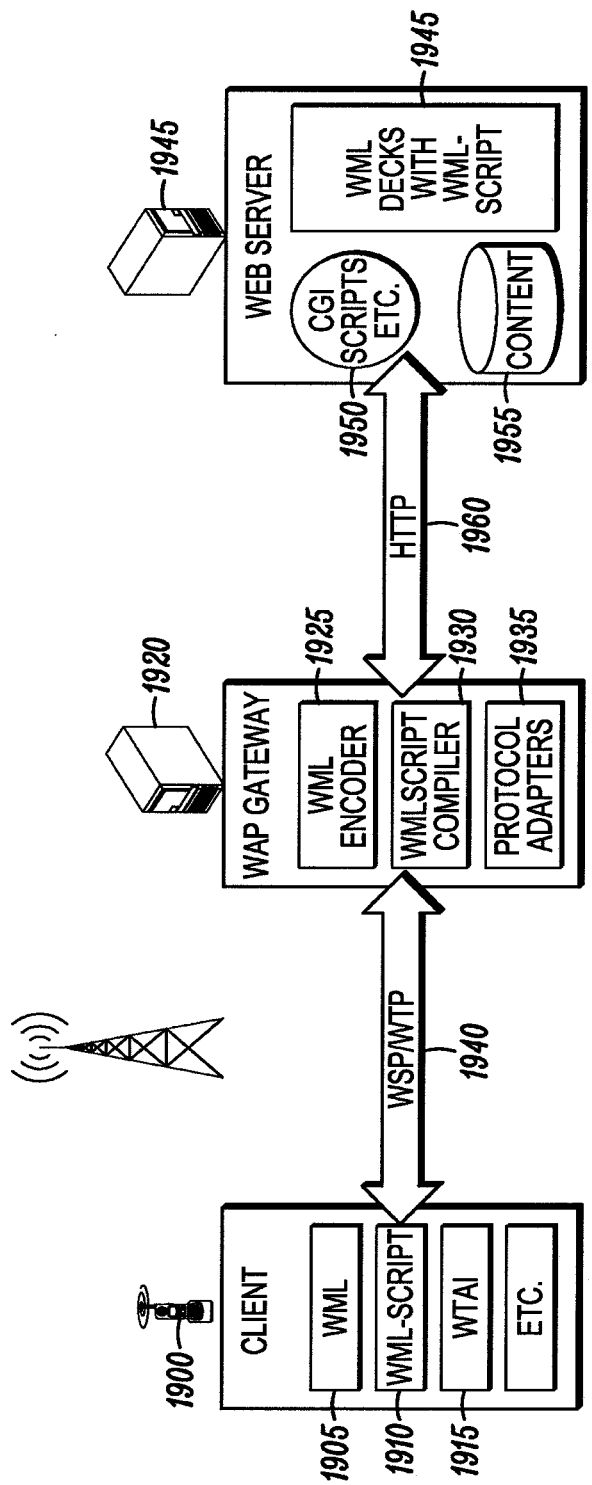
FIG. 20 is an embodiment of a network interface between an ECRM chat web server and a wireless communications device.

FIG. 20 is an embodiment of the transfer of web content to a wireless device. Wireless device 1900 utilizes, e.g., wireless markup language (WML) 1905 and WML script 1910 to specify content and user interfaces. Wireless Telephone Applications Interface (WTAI) 1915 enables applications to perform typical functions of a mobile telephone with WML or WML script and makes the user interface and processing of the mobile device programmable and customizable.

Gateway 1920 utilizes Wireless Application Protocol (UVAP), a secure specification that allows users to access information via handheld wireless devices such as mobile phones, pagers, two-way radios, smartphones and communications, and includes WML encoder 1925, WML script computer 1930 and protocol adapters 1935. Information is transferred from Gateway 1940 using wireless session protocol (WSP)/wireless transaction protocol (WTP) 18.

Web server 1945 includes Common Gateway Interface (CGI) scripts 1950, a specification for transferring information between a web server and a CGI program. A CGI program is any program designed to accept and return data that conforms to the CGI specification. The program could be written in any programming language, including C, Perl, Java or Visual Basic.

Web content 1955 is formatted and transmitted from the server using, e.g., Hyper Text Transfer Protocol (HTTP) 1960.

Web server 1945 may also include WML Decks with WML script 1965 for employee applications that reside on the server. Employee applications may also reside on a remote computer device.

The web server works to route content to the remote wireless devices. The server programs hold all the advanced functionality for the client applications (visitors and employee) to access. The server also includes an intelligent database of mobile or wireless device types called Mobile Intelligent Device Architecture (MIDA). The server applications are preferably programmed in C++ and Java script. The Java script code shown in FIG. 21 is an example of how the server application collects chat room information and transfers it to any WAP enabled mobile device.

Figure 22:
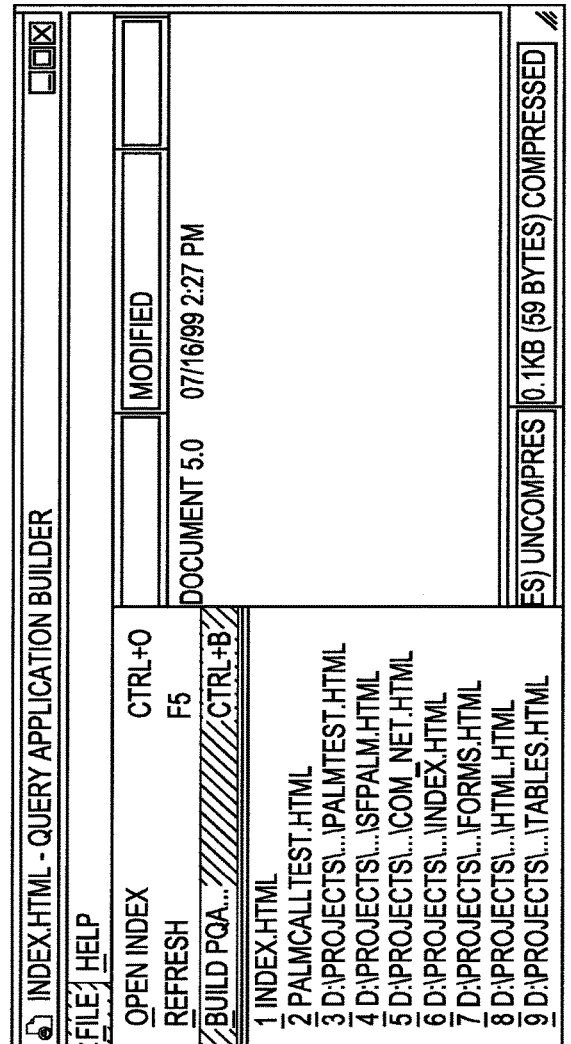
FIG. 22 is an embodiment of code for transferring information from an ECRM chat session to a wireless communications device.

The wireless device application resides on the wireless device connecting to the Internet as, e.g., a palm query application (PQA) file in the case of Palm Pilot device 107. FIG. 22 is an example of code for converting HTML into a PQA file for use as a thin client application. When compiled in the WCA (Web Clipping Application) Builder, also called Query Application Builder 2000, the file is translated into a PQA file, which can run on Palm Pilot device 107. The PQA file is designed to capture text and other types of information and pass it to the server programs. For WAP enabled mobile devices the thin client application is preferably created in WML and Wscript.

Through the use of MIDA and translation/transcoding capability, a single thin client application can be utilized that will support multiple wireless devices and Palm to Palm messaging, Palm to Mobile phone, Palm to web sites, or any unique combination of wireless Internet enabled devices and/or web sites. MIDA supports individualized functions of phones; color screens; playback of mp3 tiles; video files and more. If a mobile device manufacturer includes the ability to play a certain type of media file, not found on other devices, the server makes a reference to this capability and can push content to that device. This gives scalability to the system as device manufacturers continually improve on their mobile devices and look for ways to differentiate products from each other. Support for various devices is coded into the server application which hosts or links content which is found on the Internet. Updating the server is simply a matter of updating the MIDA database for various new devices to support new functions of next generation devices such as 3G mobile phones.

The server takes images and non-image files and matches them to device type using extensible markup language (XML) profiles generated for each device and stored in the MIDA database. The server is capable of taking a single source of content and displaying the content on multiple devices.

Images are translated through pixel re-sampling. Extra content that cannot be displayed on a particular device is removed before the image is displayed on the destination device. The same process can be used to display content such as HTML web pages on different devices. Extra content such as frames and tables that cannot be displayed on the destination device can be removed from the HTML code before sending it to the destination device.

In this manner, one thin-client application will support multiple devices. Visitors and employees do not have to download a different thin client application for each device they own. A single-centralized thin application is loaded on all devices that can support multiple device types. Instead of creating a new version of a thin client application for each new device, a new XML profile is simply added to the MIDA database to support that device.

Figure 23:
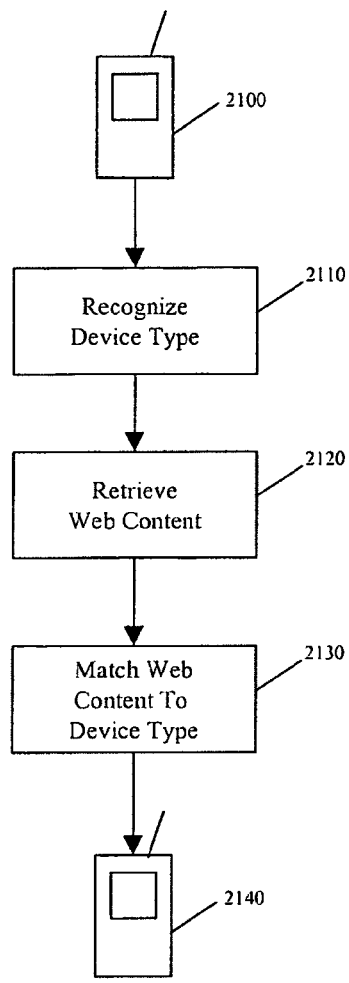
FIG. 23 is a flow chart of an embodiment of the process by which the ECRM chat server matches web content to any wireless device type.

Reference is made to FIG. 23 to illustrate an embodiment of the server's translation/transcoding capability. In Step 2100, a wireless device places a request for content (from a land line or wireless data connection to a private network or the Internet). In Step 2110, the server recognizes the device type and retrieves content, e.g., a full color image (from save machine and server or alternate server or the Internet) in Step 2120.

In Step 2130, the web server translation/transcoding capability recognizes the device type and matches content to device type using XML profiles. The XML profile contains properties such as color, depth, screen size and more and strips out content (such as color) that cannot be displayed on a destination device. Image size and resolution is changed using pixel resampling by modifying size and number of pixels. The server transmits a monochrome image, fitted to the screen dimensions of the destination device, which is received and displayed on the screen of the device in Step 2140.

In this manner, web content, including audio and video data, can be translated on the fly so that it is customized for display on multiple wireless devices. Visitors and employees can access customer service through different access points whether at a personal computer, mobile phone, or wireless device and can freely exchange such information.

Although illustrative embodiments have been described herein in detail, it should be noted and understood that the descriptions have been provided for purposes of illustration only and that other variations both in form and detail can be made thereupon without departing from the spirit and scope of the ECRM chat method, system and apparatus. The terms and expressions have been used as terms of description and not terms of limitation. There is no limitation to use the terms or expressions to exclude any equivalents of features shown and described or portions thereof and the ECRM chat method, system and apparatus should be defined with the claims that follows.

The invention claimed is:

1. A method, comprising:
providing, by a server to a computing device, an end-user interface, wherein the end-user interface includes a selectable level of security for transmissions associated with a network-based chat session for a plurality of participants;
implementing, by the server, a multi-user private chat session between a participant of the plurality of participants and an end-user associated with the network-based chat session in response to a selection of a hyperlink associated with the participant by the end-user on the end-user interface, wherein the hyperlink associated with the participant includes a hyperlink of a name of the participant;
transferring, by the server, the participant in the multi-user private chat session to a one-to-one private chat session by dragging and dropping the participant to another end-user name in the multi-user private chat session on the end-user interface; and
pushing, by the server, a streaming media file to the participant for displaying the streaming media file to the participant in the one-to-one private chat session.

2. The method of claim 1, wherein the selectable level of security for transmissions comprises a secure transmission session that includes encryption of the network-based chat session.

3. The method of claim 2, wherein the secure transmission session further comprises a secure socket layer session.

4. The method of claim 1, wherein the transmissions comprise financial transactions and network traffic.

5. The method of claim 1, wherein the selectable level of security comprises a secure transmission session and a nonsecure transmission session.

6. The method of claim 1, wherein the selectable level of security is configured to a default setting of a non-secure transmission session.

7. The method of claim 1, wherein the selectable level of security is configured to a default setting of a secure transmission session.

8. The method of claim 1, further comprising providing a plurality of stored messages.

9. The method of claim 8, further comprising selecting a stored message of the plurality of stored messages.

10. The method of claim 9, further comprising presenting the selected stored message as chat input independent of entering text comprising the selected stored message.

11. The method of claim 10, wherein the stored messages comprise selectable past responses to questions.

12. The method of claim 1, wherein the streaming media file is displayed on a window for the one-to-one private chat session or a pop up window.

13. The method of claim 1, wherein the streaming media file is displayed to the participant in the on-to-one private chat session without having the participant's clicking a link to the streaming media file or launching an application.

14. A server, comprising:
a processor; and
a memory that stores programs that, in response to execution, cause the processor to perform operations comprising:
- providing an end-user interface displayed on a computing display, wherein the end-user interface displayed on the computing display includes a selectable level of security for transmissions associated with a network-based chat session for a plurality of participants,
- implementing a multi-user private chat session between a participant of the plurality of participants and an end-user associated with the network-based chat session in response to a selection of a hyperlink associated with the participant by the end-user on the end-user interface, wherein the hyperlink associated with the participant includes a hyperlink of a name of the participant,
- transferring the participant in the multi-user private chat session to a one-to-one private chat session by dragging and dropping the participant to another end-user name in the multi-user private chat session on the end-user interface, and
- pushing a streaming media file to the participant for displaying the streaming media file to the participant in the one-to-one private chat session.

\* \* \* \* \*